(12) United States Patent  (10) Patent No.: US 7,379,640 B2
Matsumoto et al.                (45) Date of Patent:    May 27, 2008

(54) TUNABLE DISPERSION COMPENSATOR AND METHOD OF MANUFACTURING THE SAME

(75) Inventors: Sadayuki Matsumoto, Tokyo (JP);
Yasuhisa Shimakura, Tokyo (JP);
Kiichi Yoshiara, Tokyo (JP);
Masakazu Takabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/410,925

(22) Filed: Apr. 26, 2006

(65) Prior Publication Data

US 2006/0280397 A1    Dec. 14, 2006

(30) Foreign Application Priority Data

Jun. 14, 2005  (JP)  ............................. 2005-174119

(51) Int. Cl.
*G02B 6/34*  (2006.01)

(52) U.S. Cl. ............. 385/37; 385/1; 385/4; 385/8; 385/10; 385/14; 385/15; 385/31; 385/39; 385/40; 398/79; 398/80; 398/81

(58) Field of Classification Search .............. 385/1, 385/4, 8, 10, 14, 15, 37, 39, 40, 31; 398/79–81
See application file for complete search history.

(56) References Cited

U.S. PATENT DOCUMENTS

| 6,275,629 | B1 | 8/2001 | Eggleton et al. | |
| 6,643,430 | B2* | 11/2003 | Matsumoto et al. | 385/37 |
| 6,778,734 | B2* | 8/2004 | Baldwin et al. | 385/37 |
| 2003/0123800 | A1* | 7/2003 | Hashimoto et al. | 385/40 |
| 2004/0017972 | A1* | 1/2004 | Lelievre et al. | 385/37 |

FOREIGN PATENT DOCUMENTS

| JP | 2003-195234 | 7/2003 |
| JP | 2004-191510 | 7/2004 |
| JP | 2004-258462 | 9/2004 |
| JP | 2004-334052 | 11/2004 |

* cited by examiner

*Primary Examiner*—Brian Healy
*Assistant Examiner*—Hung Lam
(74) *Attorney, Agent, or Firm*—Leydig, Voit & Mayer, Ltd.

(57) ABSTRACT

A tunable dispersion compensator in which a heater portion can be easily constructed to reduce cost. A tunable dispersion compensator includes: an optical fiber having a grating portion; a heating unit for heating the grating portion to apply a temperature distribution to the grating portion; and a control unit for controlling the temperature distribution applied by the heating unit to control the group delay time characteristic of the grating portion. The heating unit includes: a heater including a single conductor having electrical resistors and which extends in a longitudinal direction of the grating portion over at least the entire length of the grating portion; and wirings electrically connected with the heater in respective positions along the longitudinal direction. The control unit supplies a voltage to each of the wirings.

18 Claims, 26 Drawing Sheets

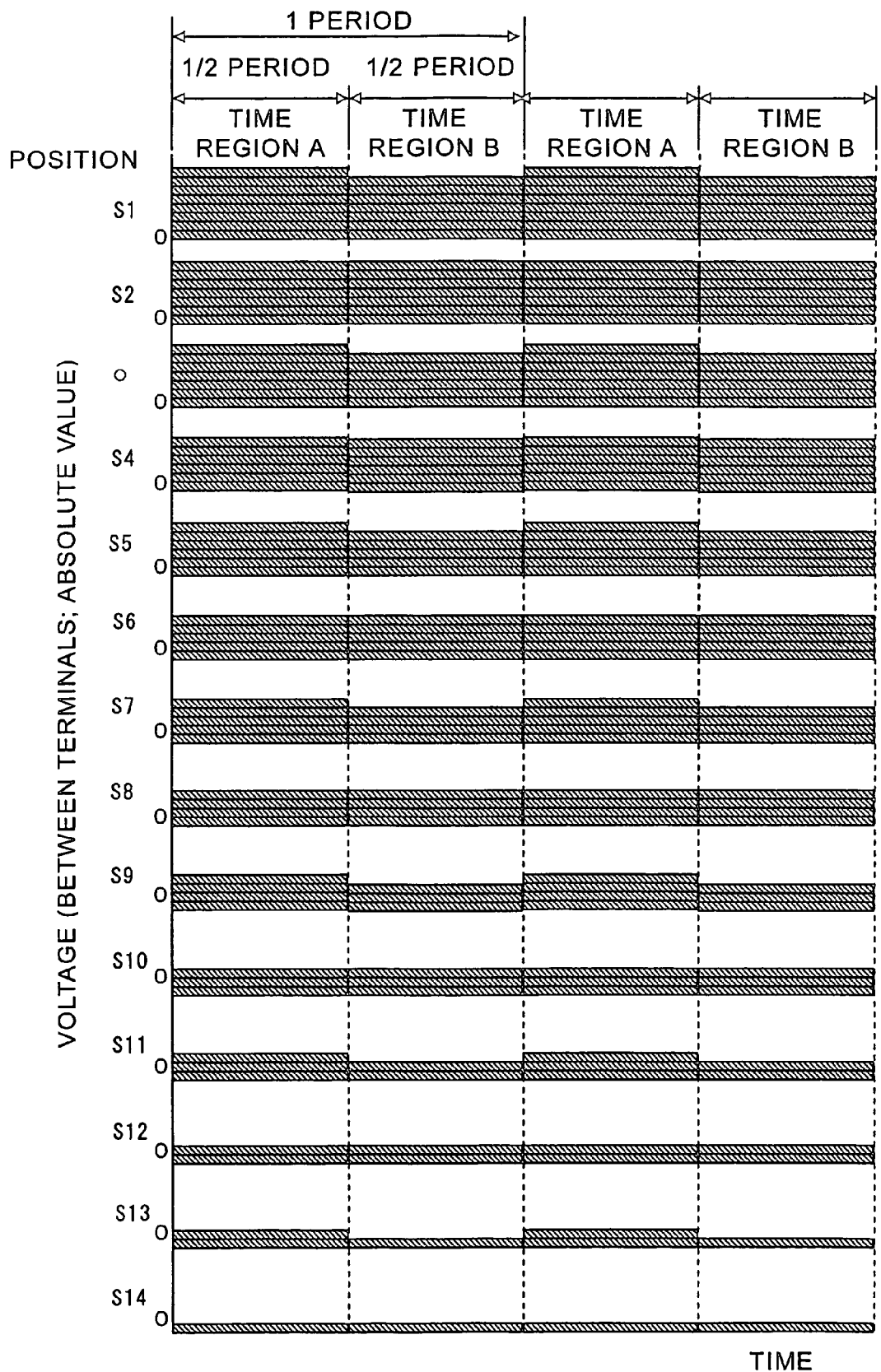

TUNABLE DISPERSION COMPENSATOR AND METHOD OF MANUFACTURING THE SAME

BACKGROUND OF THE INVENTION

1. Field of the Invention

The present invention relates to a tunable dispersion compensator and a method of manufacturing the tunable dispersion compensator, which are used to compensate for the dispersion of an optical signal in an ultra high-speed optical communication system. The tunable dispersion compensator is used to control a temperature distribution of a fiber grating formed in a part of an optical fiber for transmitting the optical signal or a temperature distribution of a chirped grating whose refractive index period changes in the longitudinal direction of an optical waveguide, thereby controlling a group delay time characteristic of the grating.

2. Description of the Related Art

In an ultra high-speed optical communication system whose transmission rate is equal to or higher than 10 Gb/s, the waveform of an optical signal is distorted by the chromatic dispersion of an optical fiber serving as a transmission line. Therefore, a dispersion compensator for compensating for the chromatic dispersion of the optical fiber is required. In particular, in an ultra high-speed optical communication system whose transmission rate is equal to or higher than 40 Gb/s, a spectral width of the optical signal is 4 times that in the system of 10 Gb/s and a time per bit is ¼ that in the system of 10 Gb/s. As a result, the influence of the dispersion on the system of 40 Gb/s becomes 16 times that on the system of 10 Gb/s, so that high-precision dispersion compensation is necessary. Thus, a tunable dispersion compensator capable of tunably controlling the dispersion of the optical fiber to dynamically compensate for the dispersion thereof is a device essential for the optical communication system whose transmission rate is 40 Gb/s.

An example of the device for dynamically compensating for the dispersion of the optical fiber includes a tunable dispersion compensator in which a plurality of heater elements are provided along a fiber grating and the power of each of the heater elements is adjusted to control a temperature distribution of the fiber grating, thereby changing the dispersion of the fiber grating. The tunable dispersion compensator is disclosed in JP 2003-195234 A (lines 45 to 48 in left section of page 5, lines 6 to 10 in right section of page 5, and FIG. 3). In this type of the tunable dispersion compensator, the plurality of heater elements is linearly formed on a surface of a quartz substrate along the axis of the fiber grating. Conditions required for the heater elements are that an area of each of the heater elements is small, the number of heater elements is large, a heater element interval is short, and the like. In particular, the heater element interval is important to make the temperature distribution of the fiber grating linear.

Heater elements identical to the above-mentioned heater elements are disclosed in Matsumoto, et. al, "Tunable Dispersion Equalizer with a Divided Thin-Film Heater for 43-Gb/s RZ Transmissions", IEEE Photon. Technol., Lett., Vol. 13, No. 8, pp. 827 to 829, August, 2001 (lower right section of p. 827 and FIG. 1). According to this description, the number of heater elements is 32 in a case of a grating having a length of 40 mm. Each of the heater elements has a width of 60 μm and a length of 1245 μm. A heater element interval is 5 μm.

In recent years, studies for bringing the optical communication system whose transmission rate is 40 Gb/s into a metro network have been popular. The metro network, which is also called a metropolitan area network (MAN), is a network for an area corresponding to a city level. In this network, when a path is blocked by network failure, it is necessary to switch from the path to another path using an optical switch or the like to maintain communications. A problem which occurs at this time is a change in length of an optical fiber transmission line which is caused by path switching. That is, a 1.3 μm zero-dispersion single-mode optical fiber which is normally used has a chromatic dispersion of approximately 17 ps/nm/km at a wavelength of 1550 nm. An allowable dispersion in a case where the transmission rate of 40 Gb/s is approximately ±100 ps/nm. Therefore, when the change in length which is caused by the path switching becomes 5.9 km or more, the waveform of the optical signal is distorted by the chromatic dispersion of the optical fiber, with the result that sufficient transmission quality cannot be ensured.

In order to solve such the problem, more specifically, in order to compensate for the chromatic dispersion caused by the path switching, the use of a tunable dispersion compensator is studied. It is desirable to complete the recovery of the path from the network failure in a shortest possible time. Therefore, a tunable dispersion compensator having a shortest possible dispersion change time is required.

In order to shorten the dispersion change time of the tunable dispersion compensator on this requirement, the following tunable dispersion compensator is described in, for example, JP 2004-258462 A (lines 17 to 47 in page 4, lines 15 to 35 in page 6, and FIGS. 1, 4, and 5). In this tunable dispersion compensator, a plurality of thin film heaters, each of which is made of tantalum nitride, are formed on a surface of a quartz substrate having a thickness of 0.1 mm. A chirped fiber grating is provided on the thin film heaters formed on the quartz substrate. A heat spreader and a Peltier device are provided on a rear surface of the quartz substrate. Power of each of the thin film heaters is controlled to apply a predetermined temperature gradient to the chirped fiber grating, thereby controlling the dispersion. With respect to the tunable dispersion compensator, a response time of the dispersion change and power consumption are measured in a case where the thickness of the quartz substrate is set to 0.02 mm, 0.1 mm, 0.5 mm, or 1 mm and the temperature gradient applied to the chirped fiber grating is set to +50° C. to −50° C. or −50° C. to +50° C. As a result, the response time of the dispersion change shortens as the thickness of the quartz substrate is reduced, thereby increasing the power consumption.

In the conventional tunable dispersion compensators, it is required that the number of heater elements is large. However, when the number of heater elements increases, there is a problem in that the number of connection wirings for the respective heater elements becomes larger and thus it is difficult to mount the heater elements. The heater element interval is a small interval of 5 μm, so there is a problem in that an advanced manufacturing technique is required and it is difficult to reduce a cost of the substrate (heater substrate) on which the heater elements are formed.

As described above, the response time of the dispersion change shortens as the thickness of the quartz substrate is reduced. However, much of heat applied to the thin film heaters flows to the heat spreader side, so that there is a problem in that the power consumption becomes larger. When the thickness of the quartz substrate is to be minimized to shorten the response time, the heat applied to the thin film heaters is immediately diffused to the heat spreader.

Therefore, there is a problem in that the predetermined temperature gradient of 50° C. cannot be applied to the grating.

SUMMARY OF THE INVENTION

The present invention has been made to solve the above-mentioned problems. An object of the present invention is to obtain a tunable dispersion compensator in which a heater portion can be easily formed to reduce a cost thereof. Another object of the present invention is to obtain a tunable dispersion compensator in which the number of heater elements virtually increases without an increase in the number of connection wirings for the heater elements, thereby obtaining a group delay time characteristic identical to that in the case where the number of heater elements increases. Another object of the present invention is to obtain a tunable dispersion compensator in which a temperature gradient can be applied to a grating without an increase in power consumption, thereby shortening a response time of a dispersion change. Another object of the present invention is to provide a method of manufacturing each of the tunable dispersion compensators.

The present invention provides a tunable dispersion compensator, characterized by including: an optical fiber having a grating portion; heating means for heating the grating portion to apply a temperature distribution to the grating portion; and control means for controlling the temperature distribution applied by the heating means to control a group delay time characteristic of the grating portion, the tunable dispersion compensator being characterized in that: the heating means includes: a heater including a single conductor having electrical resistors which is extended in a longitudinal direction of the grating portion at at least an entire length of the grating portion; and a plurality of wirings electrically connected with the heater in respective positions along the longitudinal direction; and the control means supplies a voltage to each of the wirings.

According to the present invention, it is possible to provide the tunable dispersion compensator in which the heater portion can be easily constructed to reduce a cost thereof.

BRIEF DESCRIPTION OF THE DRAWINGS

In the accompanying drawings:

FIG. 14 is an explanatory diagram showing a power applying method used for a case where a temperature distribution having a linear temperature gradient is applied to a fiber grating according to Embodiment 3 of the present invention;

DETAILED DESCRIPTION OF THE PREFERRED EMBODIMENTS

Hereinafter, a tunable dispersion compensator according to each of embodiments of the present invention will be described. In each of the embodiments, any one of a fiber grating and a chirped grating will be described. Each of the embodiments can be also applied to a tunable dispersion compensator including any one of the fiber grating and the chirped grating. Note that a generic name for a fiber grating unit and a chirped grating unit is a grating unit and a generic name for the fiber grating and the chirped grating is a grating portion.

Embodiment 1

Figure 1:
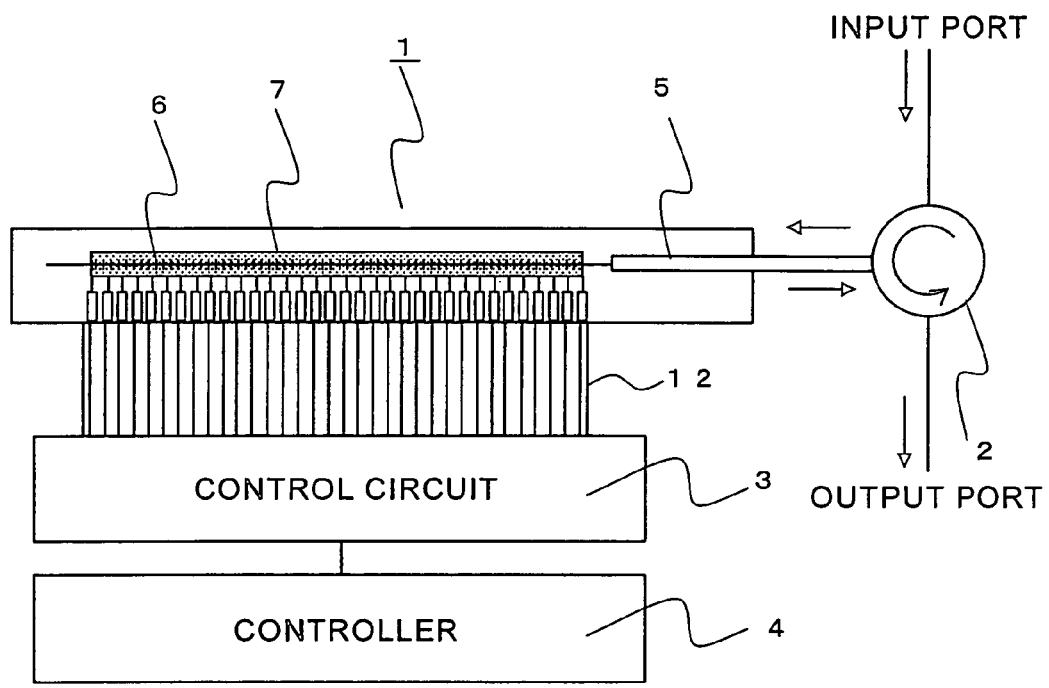
FIG. 1 is a structural diagram showing an example of a structure of a tunable dispersion compensator according to Embodiment 1 of the present invention.

FIG. 1 is a structural diagram showing an example of a structure of a tunable dispersion compensator according to Embodiment 1 of the present invention. The tunable dispersion compensator fundamentally includes a fiber grating unit 1, a circulator 2, a control circuit 3, and a controller 4. The fiber grating unit 1 is fixed to a substrate or the like such that a thin film heater 7 serving as a heating means for heating a fiber grating 6 (grating portion) is formed in a portion of an optical fiber 5 is extended along the fiber grating 6. The circulator 2 is provided on an input and output side of the optical fiber 5. The thin film heater 7 serving as the heating means which is formed along the fiber grating 6 is electrically connected with the control circuit 3 through a cable 12 or the like. The control circuit 3 is connected with the controller 4. The present invention particularly relates to the fiber grating unit 1. Therefore, for example, a directional coupler may be used instead of the circulator 2. Alternatively, the control circuit 3 which is a part of a control means for controlling a temperature of a heat generating portion of the thin film heater 7 may be integrally formed with the controller 4.

Figure 2:
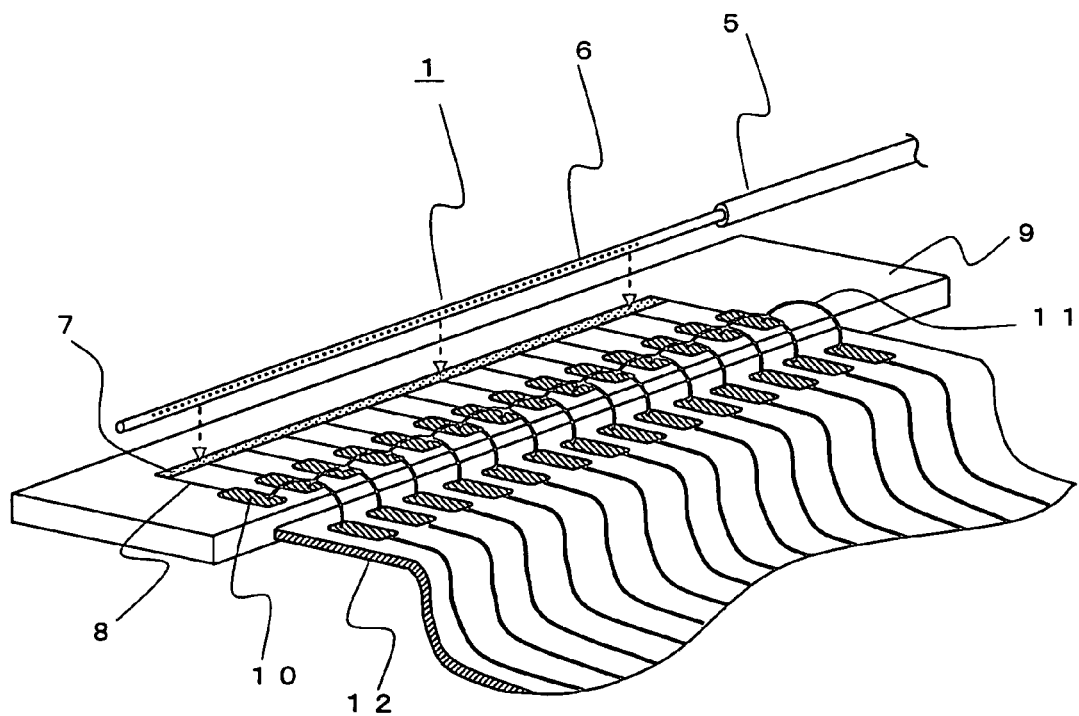
FIG. 2 is an exploded perspective view showing a fiber grating unit according to Embodiment 1 of the present invention.

FIG. 2 is an exploded perspective view showing the fiber grating unit 1 of the tunable dispersion compensator according to Embodiment 1 of the present invention. In order to explain the structure simply, the fiber grating 6 is not located on the thin film heater 7 of FIG. 2. However, the fiber grating 6 is actually located on the thin film heater 7 to heat the fiber grating 6 by the thin film heater 7. The fiber grating unit 1 has the following structure. A portion of a coating of the optical fiber 5 is removed. The fiber grating 6 is formed at a length of 40 mm in a part including a core and a clad. The core is located at the center of the optical fiber 5 and coated with the clad. The fiber grating 6 is a portion in which the interference between two ultraviolet beams is made on the optical fiber whose coating is removed in advance to produce an interference pattern, thereby causing a change in refractive index of the core which corresponds to a period of the interference pattern. The thin film heater 7 made of tantalum nitride is formed on a substrate 9 made of quartz or the like. The thin film heater 7 is electrically connected with 35 wiring patterns 8 (the number of wiring patterns is reduced in FIG. 2). The wiring patterns 8 electrically connected with electrode pads 10. The electrode pads 10 are connected with the cable 12 through gold wires 11 by wire bonding or the like. The cable 12 is connected with the control circuit 3. The cable 12 is formed of, for example, electrode pads and wiring patterns, which are formed on a flexible insulating sheet. The control circuit 3 is connected with the controller 4. As a result, the tunable dispersion compensator is obtained.

The controller 4 having a computer function includes a memory means such as a ROM (not shown) for storing data for driving the control circuit 3 based on a dispersion value inputted by a user. The controller 4 supplies signals to the control circuit 3 based on the data stored in the ROM. The signals are supplied to control transistors (or switches, a variable power source, and the like), which are included in the control circuit 3 (described later). The ROM of the controller 4 is a ROM in which each data is writable, so data can be rewritten after the tunable dispersion compensator is manufactured. Therefore, for example, even when the thin film heater 7 for heating the fiber grating 6 is uneven or even when intervals of the wiring patterns 8 vary, the data written into the ROM are adjusted, so that a temperature distribution for obtaining a characteristic corresponding to the dispersion value can be applied to the fiber grating 6.

In this embodiment, the length of the fiber grating 6 is set to 40 mm. However, the present invention is not limited to such a length and thus an arbitrary length may be set. The number of wiring patterns 8 is not limited to 35 and thus an arbitrary number of wiring patterns 8 may be used. When the number of wiring patterns 8 is large, a finer temperature distribution can be applied to the fiber grating 6. Therefore, it is preferable to use a larger number of wiring patterns 8. It is necessary to provide at least one wiring pattern 8 in a portion of the thin film heater 7 which is formed in contact with the fiber grating 6, except two wiring patterns 8 provided in both ends of the thin film heater 7. The wiring patterns 8 may be provided in arbitrary intervals. It is desirable to provide the wiring patterns 8 at intervals of 0.5 mm to 2 mm, preferably, approximately 1 mm over a range equal to or longer than the entire length of the fiber grating 6. However, the wiring patterns 8 are not necessarily provided at regular intervals. For example, the wiring patterns 8 may be provided at irregular intervals such that intervals in a central portion of the fiber grating 6 are substantially equal to one another and intervals in both end portion thereof are wider than the center portion. Although the substrate 9 is made of quartz, it may be made of another material such as glass, glass epoxy, or polyimide. In order to easily realize a temperature distribution, a substrate having low thermal conductivity is desirably used.

Figure 3A:
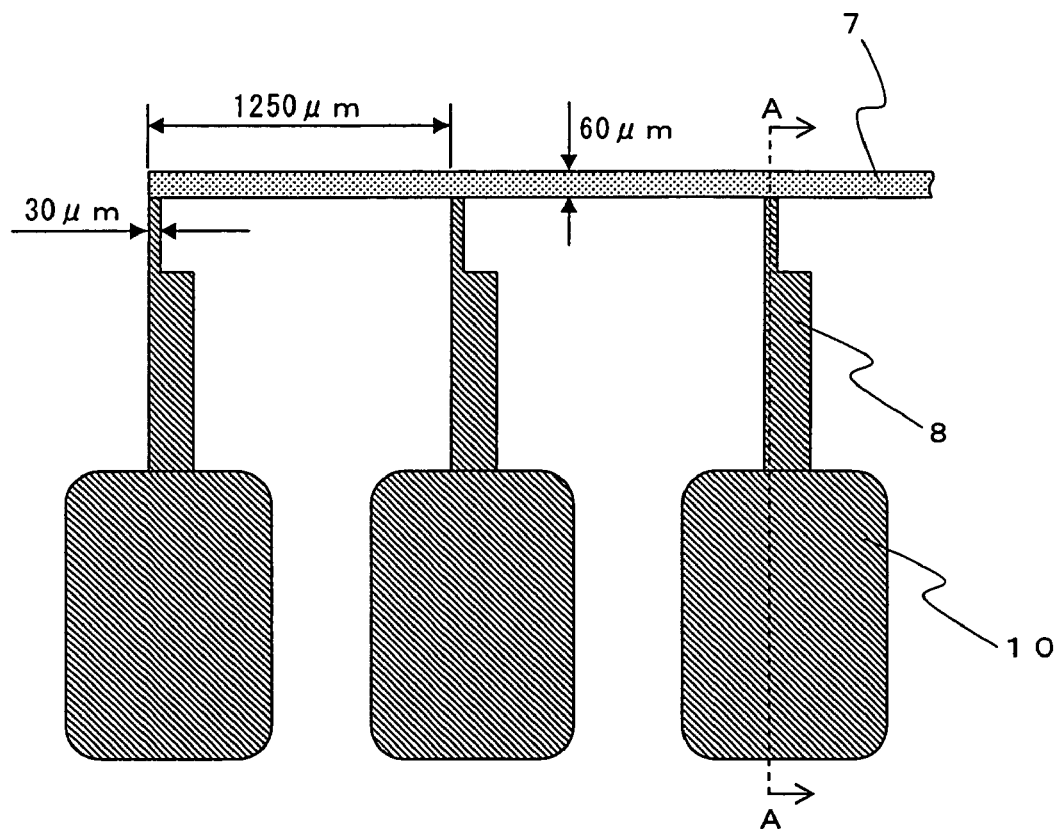
FIGS. 3A and 3B are enlarged views showing a thin film heater, wiring patterns, and electrode pads according to Embodiment 1 of the present invention.
Figure 3B:
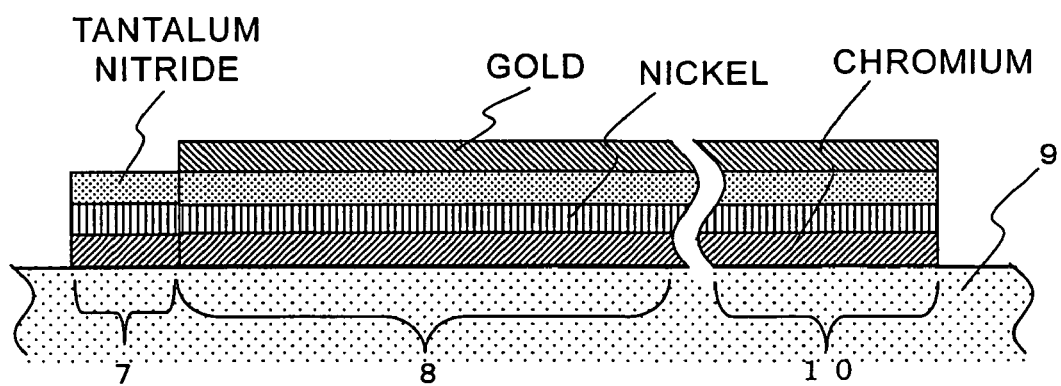

FIGS. 3A and 3B show an enlarged structure including the thin film heater 7, the wiring patterns 8, and the electrode pads 10. FIG. 3A is a front view showing the structure and FIG. 3B is a cross sectional view showing the structure along the broken line "A". Although FIG. 3A also shows a size of the thin film heater 7 and a size of each of the wiring patterns 8, the present invention is not particularly limited to the sizes. The thin film heater 7, the wiring patterns 8, and the electrode pads 10 are formed as several layers by a thin film forming process. A chromium film is formed on the substrate 9 made of quartz and a nickel film is formed thereon. After that, a tantalum nitride film is formed. Finally, a gold film is formed for the wiring patterns 8 and the electrode pads 10. Note that a gold film is not formed for the thin film heater 7. When each of the films are to be formed, a patterned mask is used for each film forming process, so it is necessary to perform an alignment on the mask with high precision. When the plurality of heater elements used for the conventional tunable dispersion compensator are formed, the heater element interval is a very small interval of 5 µm, so an advanced alignment is required, with the result that a manufacturing cost becomes higher and a yield is low. On the other hand, according to the tunable dispersion compensator of the present invention, the single thin film heater 7 is formed along the fiber grating 6, a width of the thin film heater 7 is set to 60 µm, and a width of each of the wiring patterns 8 is set to 30 µm. Therefore, unlike the conventional tunable dispersion compensator, there is no extremely fine size limit such as 5 µm. Even when a slight displacement occurs, there is no case where a manufactured tunable dispersion compensator becomes defective. Thus, the manufacturing cost can be reduced and the yield can be improved.

Figure 4:
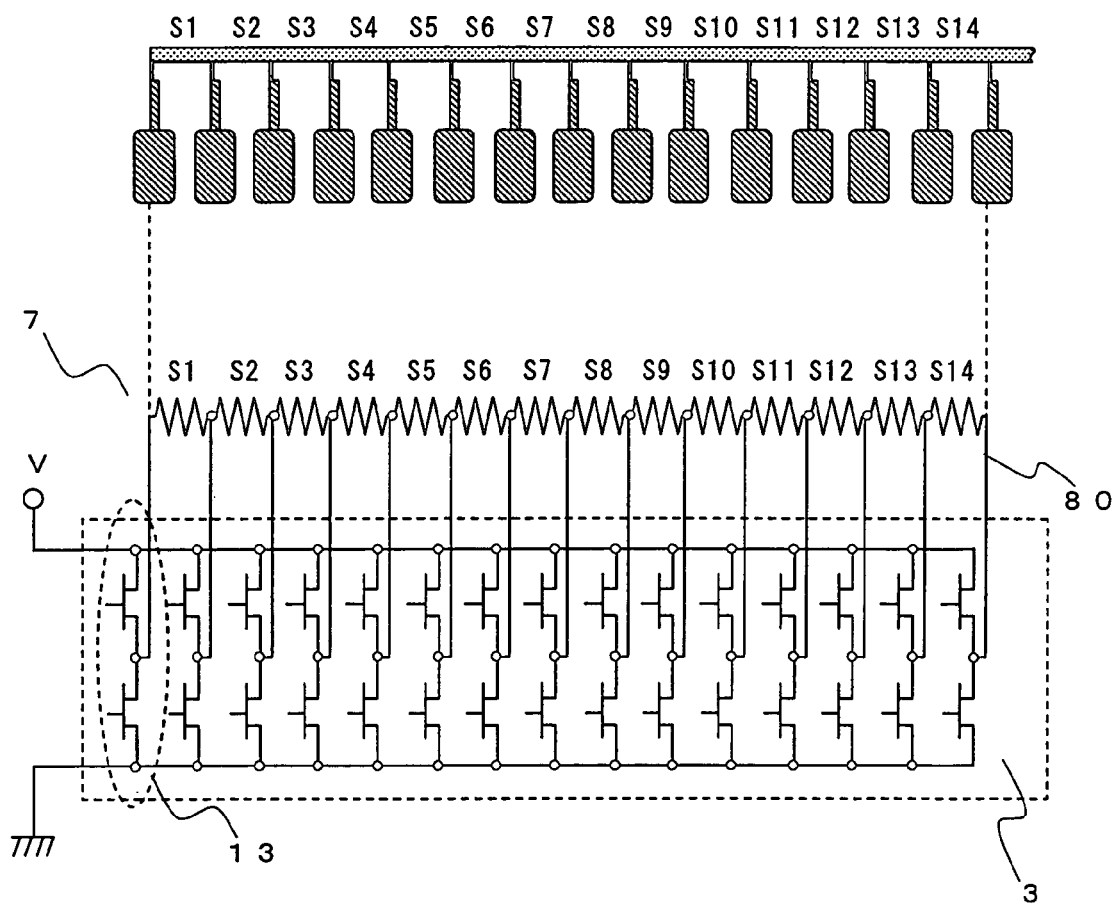
FIG. 4 shows a model of the thin film heater, an equivalent circuit thereof, and a control circuit according to Embodiment 1 of the present invention.

Next, an operation of the tunable dispersion compensator according to the present invention will be described. FIG. 4 shows a model of the thin film heater 7, an equivalent circuit thereof, and the control circuit 3. The equivalent circuit of the thin film heater 7 is indicated by resistor symbols. For later illustrative purposes, regions of the thin film heater 7 which are separated by the wiring patterns 8 are indicated by reference symbols of S1 to S14. A wiring 80 indicates a wiring which includes the wiring pattern 8, the electrode pad 10, the wire 11, and the cable 12 and which is located between the thin film heater 7 and the control circuit 3. Here, the number of regions of the thin film heater 7 which are separated by the wiring patterns 8 is 14. As described above, the 35 wiring patterns 8 are provided, so the number of regions is set to 34. The interval of the wiring patterns 8 is 1250 µm as shown in FIG. 3A, so the entire length of the thin film heater 7 is 42.5 mm. It is desirable that the entire length of the thin film heater 7 is longer than the length of the fiber grating 6. This is because the temperature is prevented from lowering in the both ends of the fiber grating 6 and a margin of a displacement which may be caused when the fiber grating 6 is located on the thin film heater 7 is provided. The control circuit 3 includes push-pull type transistor circuits (push-pull circuits) 13, each of which is provided for each of the wiring patterns 8 and formed of two transistors such as bipolar transistors or field effect transistors. The transistor circuits 13 are connected with the respective wiring patterns 8 through the wires 11 and the electrode pads 10. A voltage V is applied between the two transistors of each of the transistor circuits 13. When one of the two transistors of each of the transistor circuits 13 is turned ON and the other thereof is turned OFF, the voltage V or a ground (GND) potential (reference potential) is applied to each of the wiring patterns 8. The ON/OFF control of each of the transistor circuits 13 is performed by the controller 4.

Figure 5:
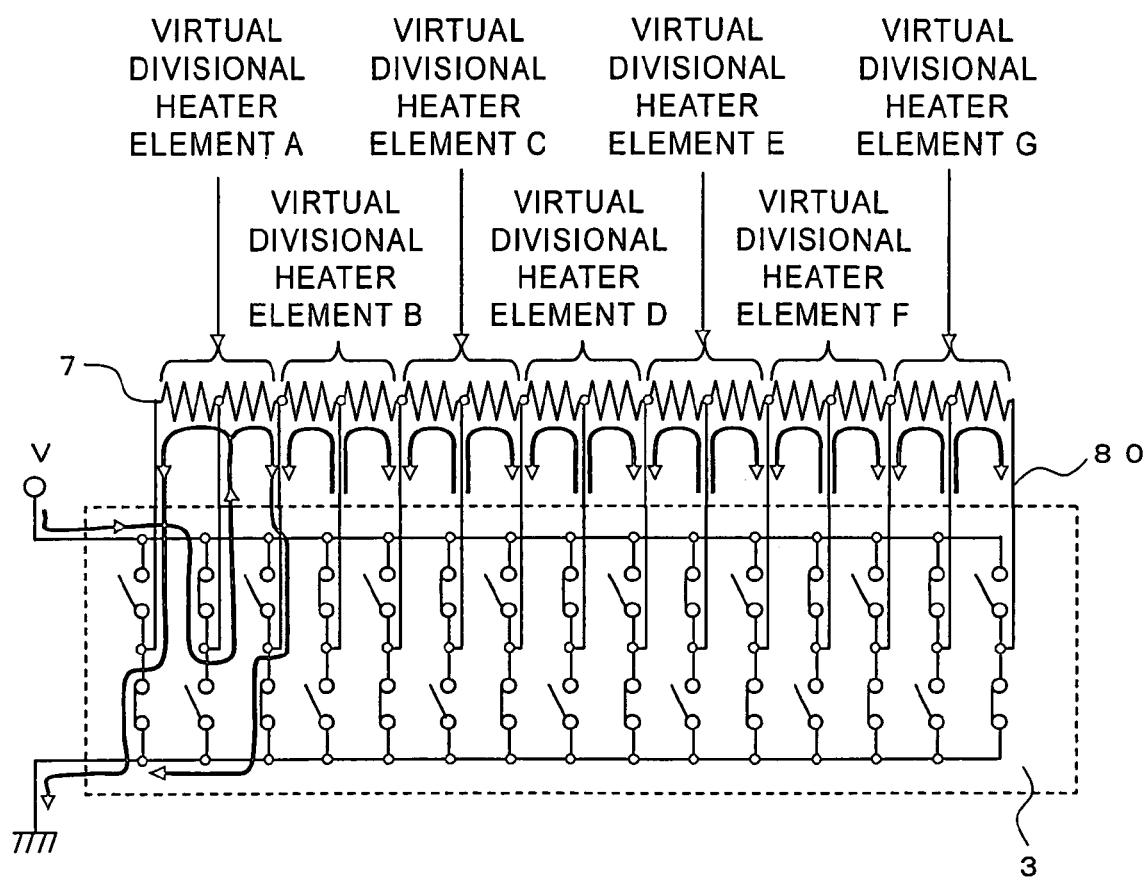
FIG. 5 shows an equivalent circuit of the thin film heater and an operation of the control circuit according to Embodiment 1 of the present invention.
Figure 6:
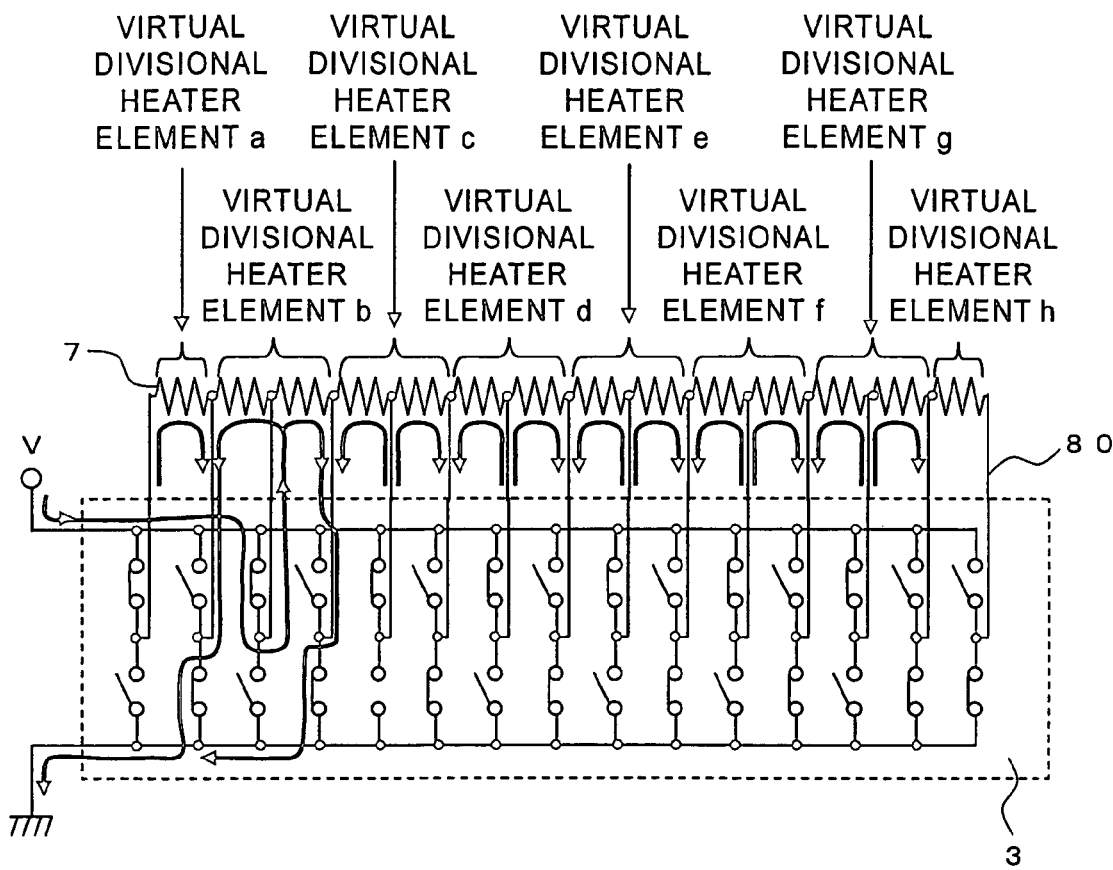
FIG. 6 shows an equivalent circuit of the thin film heater and an operation of the control circuit according to Embodiment 1 of the present invention.

FIGS. 5 and 6 show the operation of the transistor circuits 13 and a current flow state in the circuit shown in FIG. 4 in a case where the voltage V and the ground (GND) potential are alternately applied to the respective wiring patterns 8. In order to explain an ON/OFF state simply, the transistor circuits 13 are indicated by switch symbols. As shown in FIGS. 5 and 6, each current flows from the wiring pattern 8 to which the voltage V is applied into the thin film heater 7 and then flows out from the wiring pattern 8 to which the ground (GND) potential is applied. Therefore, the regions of the thin film heater 7 formed as a long single heater along the fiber grating 6 are separated by the wiring patterns 8 to which the ground (GND) potential is applied, so the regions can be operated as virtual divisional heater elements. The virtual divisional heater elements are indicated as virtual divisional heater elements "A" to "G" shown in FIG. 5. In addition, the virtual divisional heater elements are indicated as virtual divisional heater elements "a" to "h" shown in FIG. 6. A current does not flow through the virtual divisional heater element "h" shown in FIG. 6 because the ground (GND) potential is applied to both ends thereof through the adjacent wiring patterns 8. However, the virtual divisional heater element "h" can be also assumed to be a virtual divisional heater element. In the tunable dispersion compensator, the temperature distribution of the fiber grating 6 is controlled to control a group delay time of the fiber grating 6, thereby changing the dispersion or a dispersion slope. Therefore, a current does not constantly flow through the thin film heater 7. For example, even in the case of the virtual divisional heater element "D", in view of a time region, the ground (GND) potential is applied thereto by switching of the transistor circuit used to apply the voltage V thereto as shown in FIG. 5. Thus, there is a period for which the current does not flow through the virtual divisional heater element "D".

Figure 7:
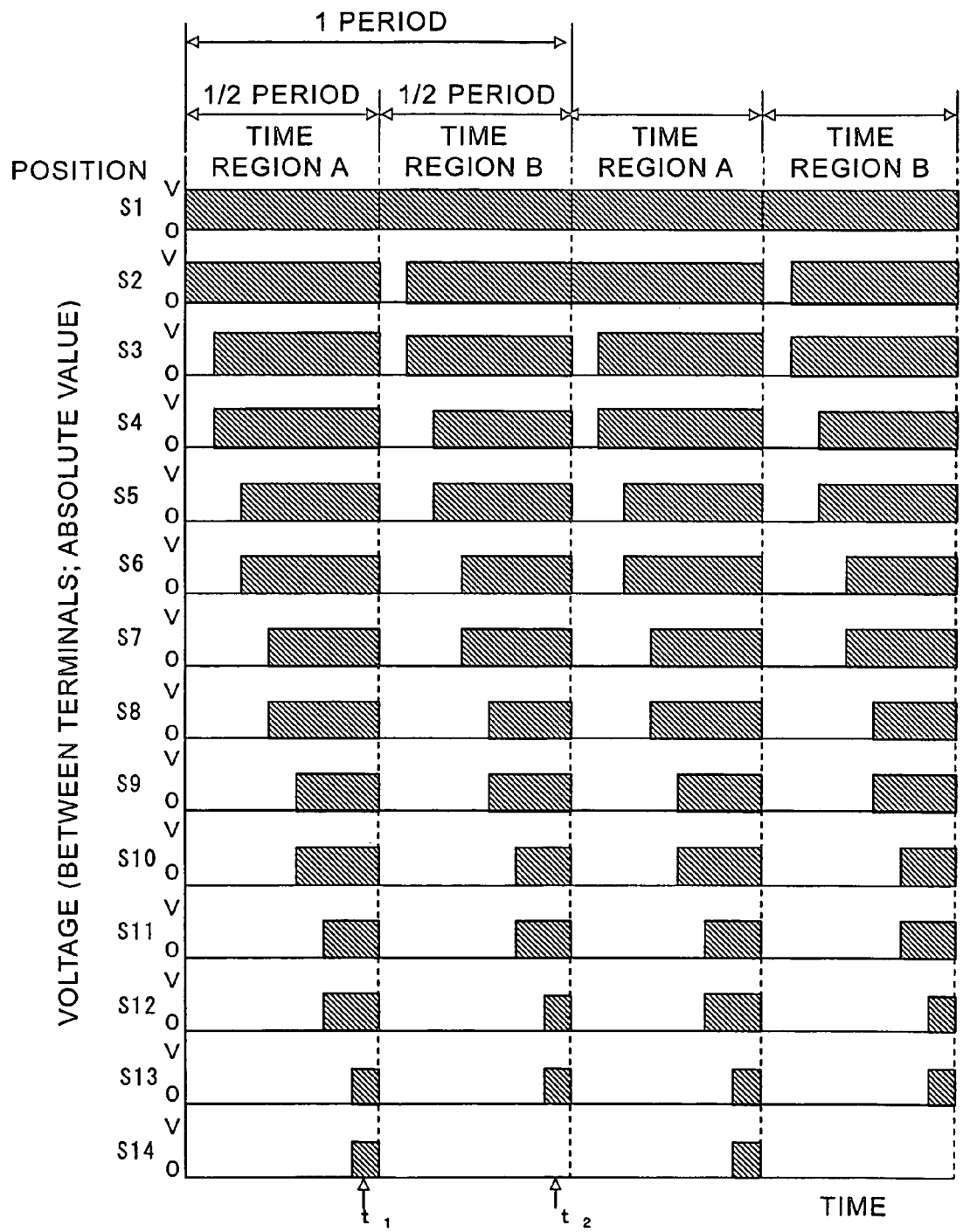
FIG. 7 is an explanatory diagram showing a power applying method used for a case where a temperature distribution having a linear temperature gradient is applied to a fiber grating according to Embodiment 1 of the present invention.

FIG. 7 shows a power applying method used for a case where a temperature distribution having a linear temperature gradient is applied to the fiber grating 6, which is a time chart showing a waveform of a voltage applied to each of the regions S1 to S14. The voltage is a pulse voltage having a predetermined voltage value. The pulse voltage is applied at a controlled duty ratio. When the voltage applied to each of the regions S1 to S14 for one of the first half and the second half of one period is assumed as a reference voltage, the polarity thereof is actually reversed for each ½ period. However, only whether or not the voltage V is applied is shown in FIG. 7. That is, the voltage between terminals of each of the regions is indicated by an absolute value. The one period of the time chart shown in FIG. 7 is a time sufficiently shorter than a time constant for temperature change, of the fiber grating 6 in a case where the current is supplied to the thin film heater 7, which is approximately 1 milliseconds to 50 milliseconds. The one period includes a time region "A" and a time region "B", each of which is ½ period (sub period). When the ON/OFF control of the transistor circuits 13 is performed, the voltage waveforms shown in FIG. 7 are applied to the respective regions. In FIG. 7, a ratio between the one period and a time for which the voltage is applied to each of the regions S1 to S14, that is, a duty ratio is controlled so as to reduce from the region S1 to the region S14 at a predetermined rate. ON/OFF states of the transistor circuits 13 at a time $t_1$ shown in FIG. 7 is shown in FIG. 5 and ON/OFF states of the transistor circuits 13 at a time $t_2$ shown in FIG. 7 is shown in FIG. 6.

Figure 8A:
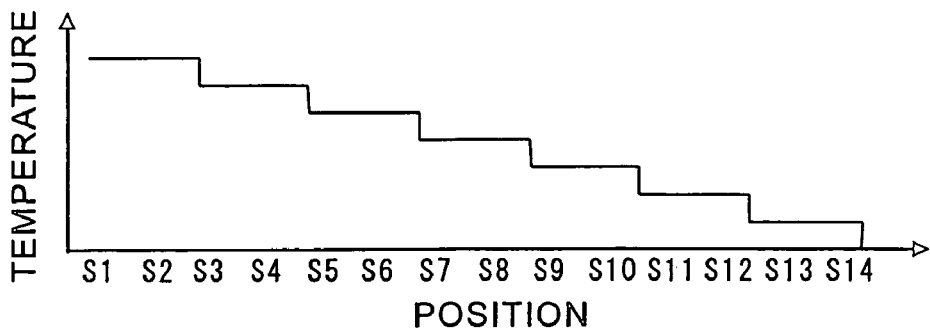
FIGS. 8A, 8B, and 8C show temperature distributions applied to the fiber grating in a case where the power is applied as shown in FIG. 7.
Figure 8B:
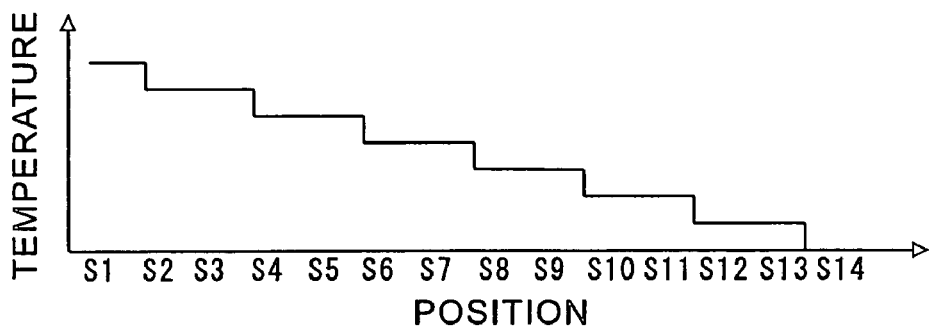
Figure 8C:
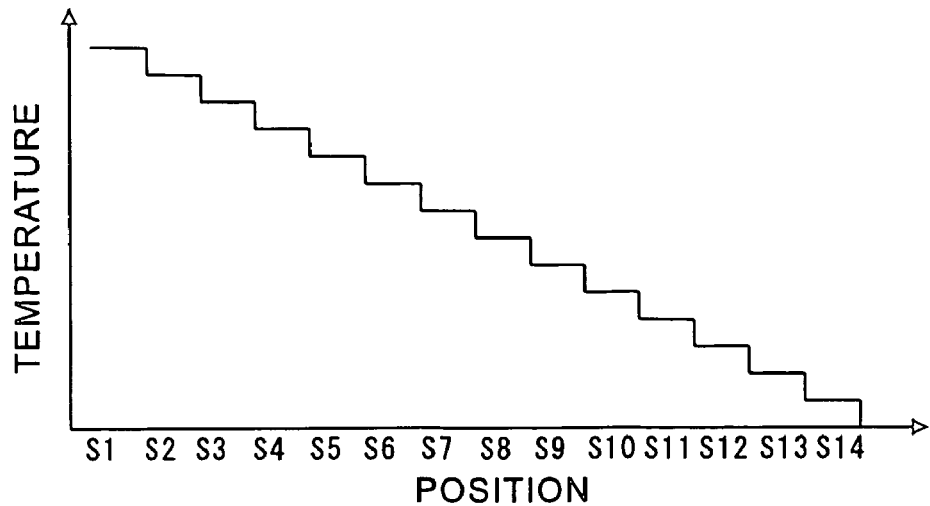

FIGS. 8A, 8B, and 8C show temperature distributions applied to the fiber grating 6 in a case where the voltages are applied as shown in the time chart of FIG. 7. The temperature distribution as shown in FIG. 8A is applied with power produced for the time region "A" shown in FIG. 7. The temperature distribution as shown in FIG. 8B is applied with power produced for the time region "B". Therefore, The temperature distribution as shown in FIG. 8C is actually applied to the fiber grating 6. The temperature distributions shown in FIGS. 8A and 8B are used for only explanation. The one period for the voltage application is sufficiently shorter than the time constant for temperature change, so the temperature distribution as shown in FIG. 8C is applied to the fiber grating 6 even for the time region "A" or "B". In this embodiment, the case where a linear temperature distribution having a downward slop is applied to the fiber grating 6 is described. A linear temperature distribution having an upward slop can be applied. The temperature gradient can be arbitrarily adjusted.

Figure 9:
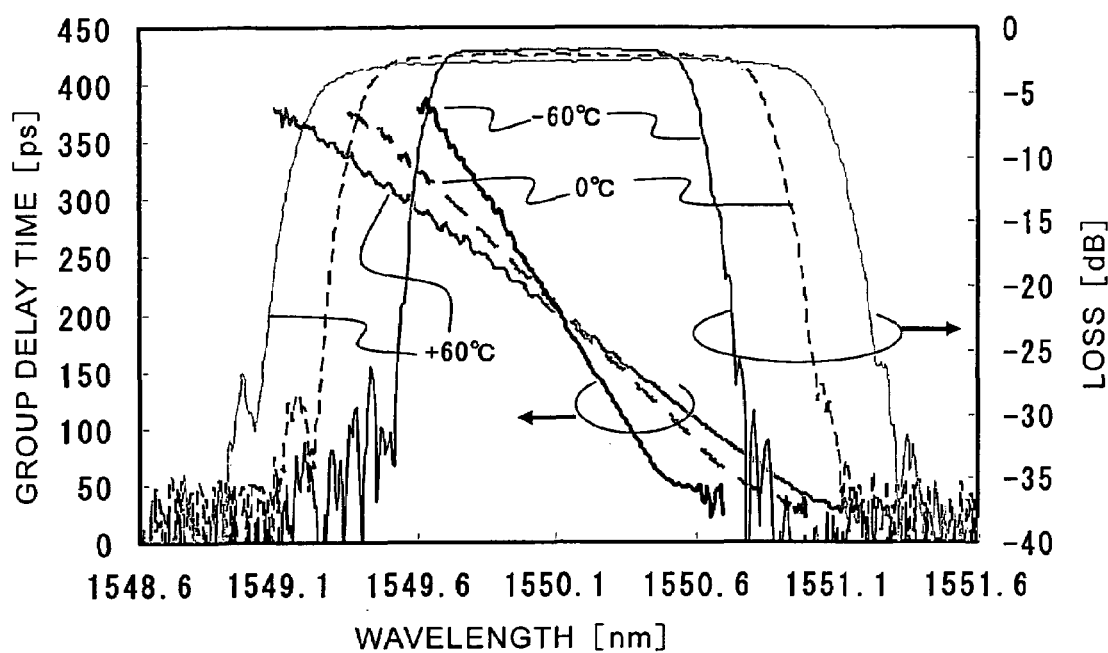
FIG. 9 shows a group delay time characteristic and a loss characteristic of the tunable dispersion compensator according to Embodiment 1 of the present invention.

FIG. 9 shows changes in group delay time characteristic and loss characteristic in a case where the temperature gradient changes in the tunable dispersion compensator using the fiber grating 6 having a length of 40 mm according to the present invention. In FIG. 9, each of −60° C., 0° C., and +60° C. indicates a temperature difference between regions of the thin film heater 7 which correspond to both ends of the fiber grating 6 which are separated from each other by 40 mm in a case where a linear temperature distribution is applied to the thin film heater 7. Each of the temperature differences corresponds to a temperature gradient over 40 mm. The temperature gradient of −60° C. is a downward linear temperature gradient and the temperature gradient of +60° C. is an upward linear temperature gradient. Note that input and output ends of the fiber grating 6 are located on the right side. The temperature gradient of 0° C. corresponds to a linear temperature distribution in which a temperature difference between both the ends of the fiber grating is 0° C., that is, indicates that a predetermined temperature distribution is applied to the entire fiber grating. In the case of each of the temperature gradients of −60° C., +60° C., and 0° C., a temperature at the center of the fiber grating 6 is controlled to maintain to be substantially a predetermined temperature. Therefore, the respective group delay time characteristics intersect with one another at the center wavelength. Dispersion values of the respective group delay time characteristics are −383 ps/nm at −60° C., −239 ps/nm at 0° C., and −180 ps/nm at +60° C., with the result that the dispersion can be controlled in a range width of approximately 200 ps/nm. Thus, even in the case of the structure of the tunable dispersion compensator according to the present invention, the group delay time characteristic can be controlled by the temperature gradient control as in the case of the conventional tunable dispersion compensator.

Here, the number of wiring patterns connected with the thin film heater of the tunable dispersion compensator according to the present invention is compared with the number of wiring patterns connected with the heater elements of the conventional tunable dispersion compensator. In the present invention, as described above, the 35 wiring patterns are connected with the thin film heater. On the other hand, because it is necessary to provide two wiring patterns in both ends of a heater element in the conventional tunable dispersion compensator, when the number of heater elements is to be made equal to the number of virtual divisional heater elements of this embodiment, 68 (=2×34) heater elements are required. Therefore, according to the tunable dispersion compensator of the present invention, the thin film heater is easily produced. In addition to this, the number of wiring patterns led from the thin film heater can be reduced.

In this embodiment, the case where the dispersion of the fiber grating is controlled by the application of the linear temperature gradient is described. The temperature distribution to be applied is not limited to the linear temperature distribution. A quadratic function type temperature distribution may be applied to change the dispersion slope of the fiber grating. The temperature distribution may be an arbitrary temperature distribution. It is also possible to apply a temperature distribution for canceling a group delay ripple specific to the fiber grating. That is, it is possible to apply the same temperature distribution as that of the conventional tunable dispersion compensator in which the plurality of heater elements are provided around the circumference side surface of the fiber grating to control the temperature distribution.

In the tunable dispersion compensator according to the present invention, the plurality of physically separated heater elements used for the conventional tunable dispersion compensator are not provided, so it is unnecessary to provide an interval between heater elements. Therefore, it can be assumed that the interval between the heater elements is infinitesimal. That is, when the interval between the heater elements is large in the conventional tunable dispersion compensator, a temperature of an interval region located between the heater elements is reduced, so that this causes the occurrence of a group delay ripple in the group delay time characteristic of the fiber grating. When there is no interval between the virtual divisional heater elements as in the present invention, the temperature is not reduced. Therefore, there is an effect that the group delay ripple caused by the large interval is prevented. The respective virtual divisional heater elements are electrically and thermally connected in series, so even when the step power as described in this embodiment is applied, heat flows in and out at a time when the power changes. Therefore, the temperature distribution of the heater elements becomes smoother than the step temperature distribution. When the temperature distribution of the heater elements has a step shape, this causes the occurrence of the group delay ripple. However, when the temperature distribution becomes smoother than the step shape, an effect in which the group delay ripple caused by the step shape can be reduced is obtained. When the temperature distribution becomes smoother, an effect in which the number of divisional heater elements, that is, the number of wiring patterns connected with the heater elements can be reduced is obtained.

In this embodiment, the applied voltage is changed for each ½ period. The period for changing the voltage is not limited to the ½ period and thus may be an arbitrary period such as a ⅓ period or a ¼ period. The one period may be divided into a plurality of sub periods at an arbitrary time ratio and with an arbitrary number. In this case, it is complicated to adjust power applied for each of the sub periods. Thus, as described in this embodiment, it is simple to set the ½ period.

Embodiment 2

In Embodiment 1, the voltage pattern applied to the wiring patterns for each half period is changed to control the temperature of the thin film heater. A fixed voltage pattern can be applied for the one period without changing the voltage pattern for each half period. In this case, when the number of wiring patterns is made substantially equal to that of the conventional tunable dispersion compensator, the same temperature distribution can be produced. Although there is no advantage in the number of wiring patterns, an advanced technique for manufacturing the thin film heater is unnecessary and the control circuit can be simplified.

Figure 10:
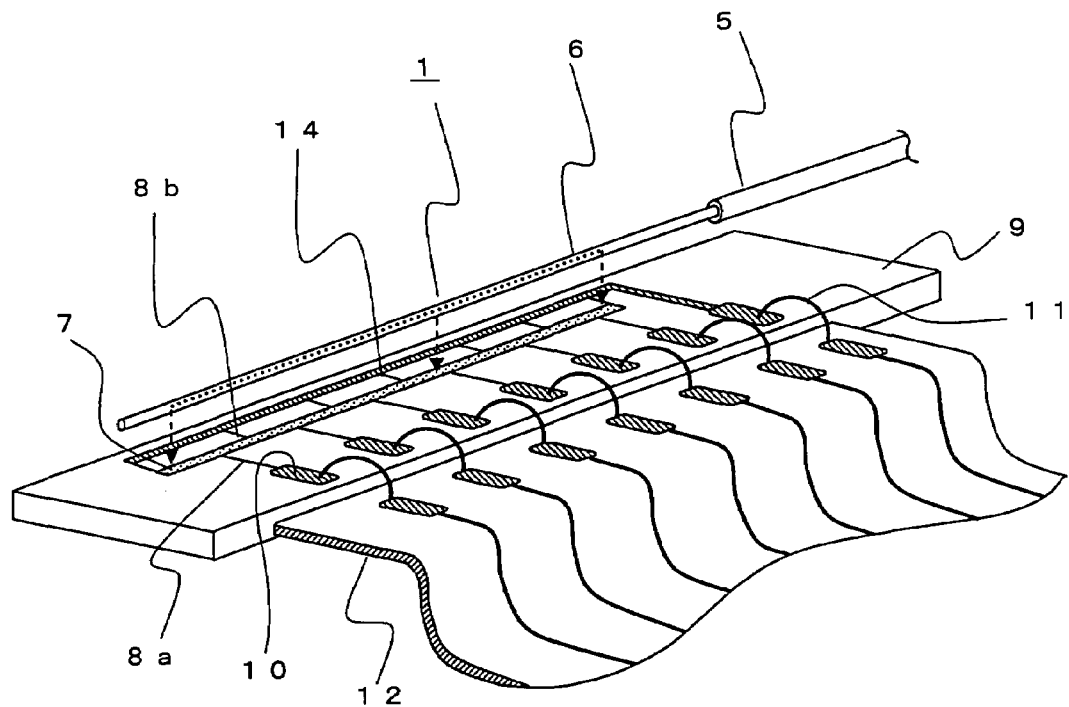
FIG. 10 is an exploded perspective view showing a fiber grating unit according to Embodiment 2 of the present invention.

FIG. 10 is an exploded perspective view showing a fiber grating unit 1 of a tunable dispersion compensator according to Embodiment 2 of the present invention. The same parts as those of Embodiment 1 and parts corresponding thereto are indicated by the same reference symbols. The thin film heater 7 is formed on the substrate 9. Wiring patterns 8a and 8b to be formed are electrically connected with the thin film heater 7. The wiring patterns 8a and 8b are alternately located. The wiring patterns 8a are connected with the control circuit 3 through the separate electrode pads 10 and the cable 12. The wiring patterns 8b are collectively connected with an electrode pad 10 through a common wiring 14. The electrode pad 10 is connected with a ground (GND) potential terminal of the control circuit 3 through the cable 12. The wiring patterns 8b connected with the ground (GND) potential terminal are formed in both ends of the thin film heater 7.

Figure 11:
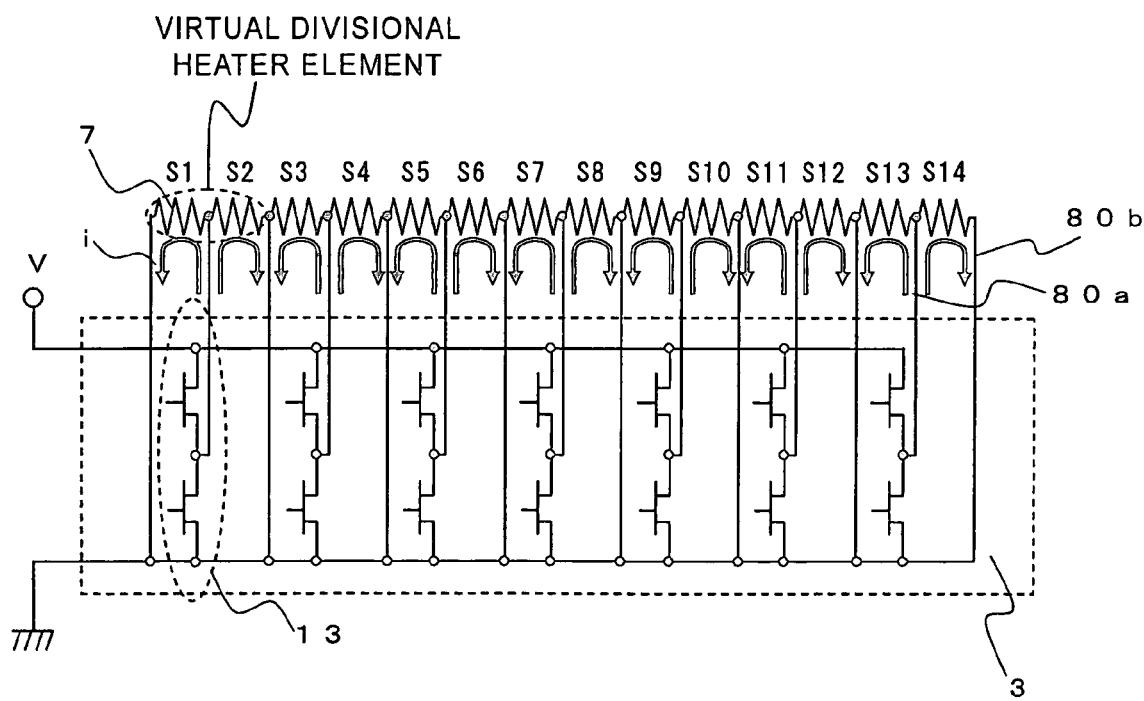
FIG. 11 shows an equivalent circuit of a thin film heater and an operation of a control circuit according to Embodiment 2 of the present invention.

FIG. 11 shows an equivalent circuit of the thin film heater 7 of the tunable dispersion compensator according to this embodiment and the control circuit 3 thereof. The thin film heater 7 is indicated by resistor symbols. The regions separated by the wiring patterns 8a and 8b are indicated by the symbols of S1 to S14 as in Embodiment 1. A wiring 80a indicates a wiring which includes the wiring pattern 8a, the electrode pad 10, the wire 11, and the cable 12 and which is located between the thin film heater 7 and the control circuit 3. A wiring 80b indicates a wiring which includes the wiring pattern 8b, the electrode pad 10, the wire 11, and the cable 12 and which is located between the thin film heater 7 including the wiring pattern 8b, the electrode pad 10, the wire 11, and the cable 12 and the control circuit 3. The wiring patterns 8a are connected with the transistor circuits 13 of the control circuit 3. Each of the transistor circuits 13 operates as in Embodiment 1 to perform the switching of the voltage V. Unlike Embodiment 1, a current flows through the thin film heater 7 in the same direction in this embodiment. Therefore, a single transistor instead of each of the transistor circuits may be used to control an ON/OFF state of the voltage V (connection or separation). The operation of the equivalent circuit is identical to the operation for the half period as described in Embodiment 1, that is, the operation for the time region "A" shown in FIG. 7. In other words, the regions separated by the wiring patterns 8b connected with the ground (GND) potential terminal become virtual divisional heater elements.

Figure 12A:
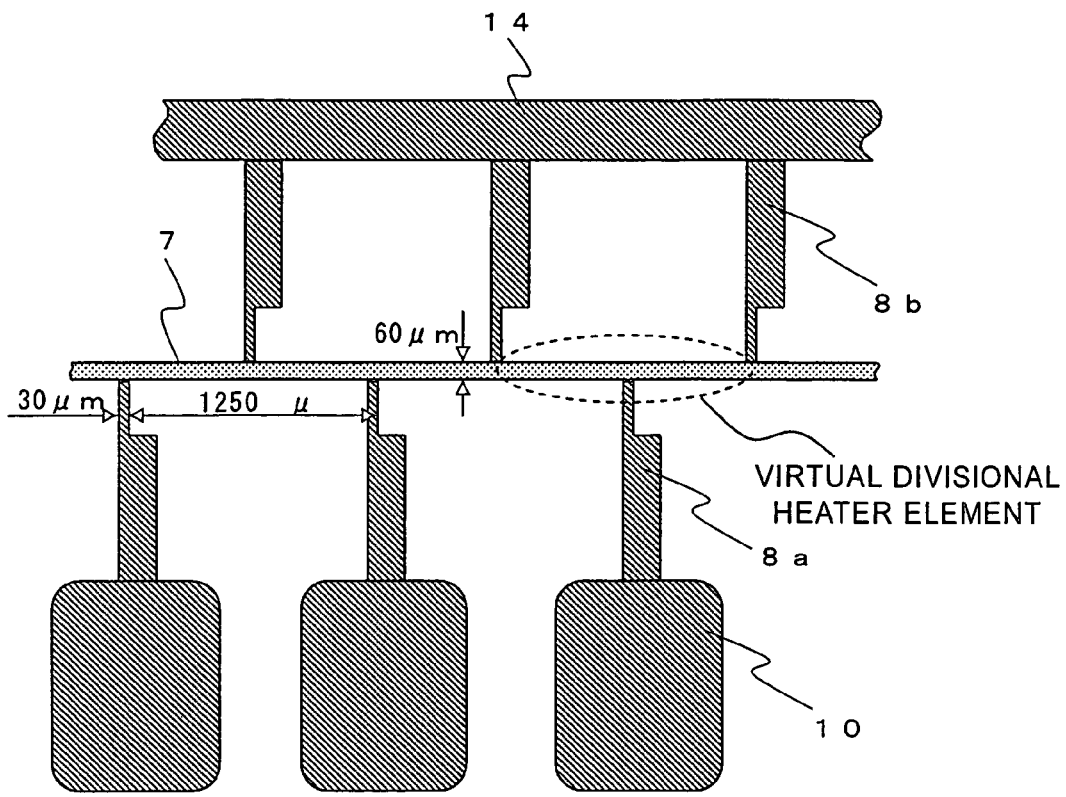
FIGS. 12A and 12B are enlarged views showing thin film heaters, wiring patterns, and electrode pads according to Embodiment 2 of the present invention and a conventional case.
Figure 12B:
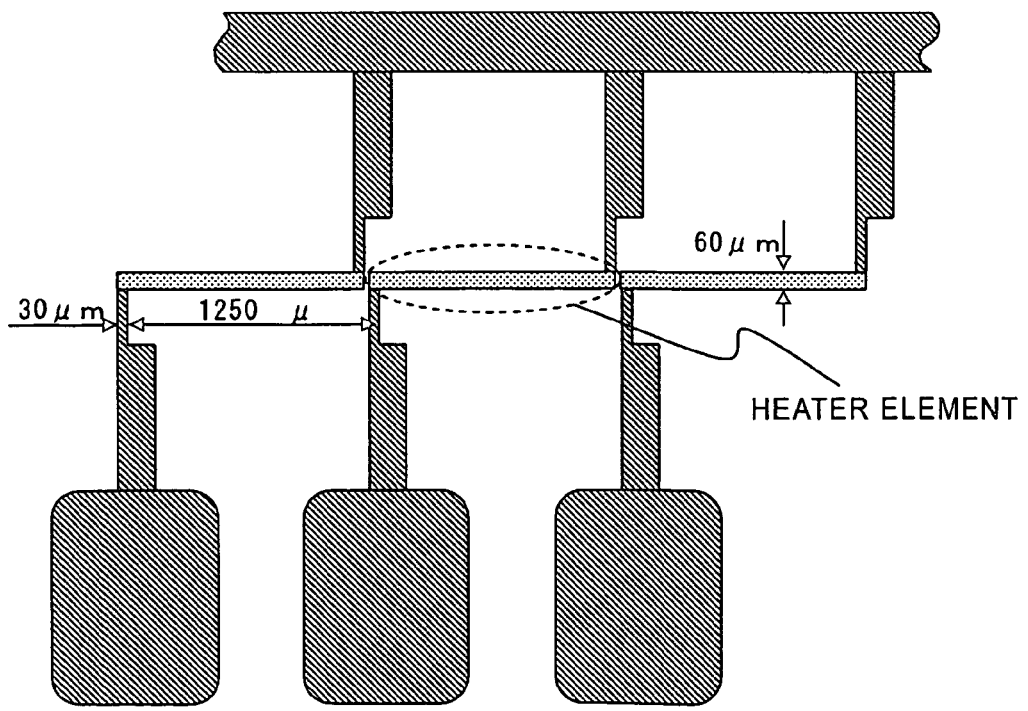

FIG. 12A is an enlarged view showing a detailed structure near the thin film heater 7 of this embodiment and FIG. 12B is an enlarged view showing the conventional heater elements and vicinities thereof. As is apparent from the comparison between FIGS. 12A and 12B, when the number of wiring patterns is substantially equal to that for the conventional heater elements, the number of virtual divisional heater elements can be made equal to the number of conventional heater elements. To be precise, when the number of virtual divisional heater elements is to be made equal to the number of conventional heater elements, the number of wiring patterns 8a may be equal to the number of virtual divisional heater elements and the number of wiring patterns 8b may be larger than the number of virtual divisional heater elements by one. That is, when 34 heater elements are to be provided in the conventional tunable dispersion compensator, 68 wiring patterns are required. On the other hand, when 34 virtual divisional heater elements are to be provided in the tunable dispersion compensator according to this embodiment, 69 wiring patterns are required.

As described above, when the number of virtual divisional heater elements is large, a slight difference such as one wiring pattern does not cause an increase in manufacturing cost. When the heater is constructed of a single heater as in this embodiment, it is unnecessary to manufacture the respective heater elements at extremely small intervals of 5 µm, unlike a conventional case. In addition, it is unnecessary to use an advanced manufacturing method. Therefore, a manufacturing cost can be reduced. The same operation can be performed by the control circuit identical to that of the conventional tunable dispersion compensator. Thus, a cost for developing a new control circuit is unnecessary, so that a cost of the substrate on which the thin film heater is formed can be reduced, thereby reducing a cost of the tunable dispersion compensator.

Embodiment 3

In each of Embodiments 1 and 2, the case where the power of the thin film heater is controlled based on the duty ratio of the voltage pulse is described. However, the present invention is not limited to this case. For example, the power of the thin film heater can be controlled based on a level of a voltage value or a level of a current value. In this embodiment, a case where the power of the thin film heater is controlled based on an analog voltage value will be described.

Figure 13A:
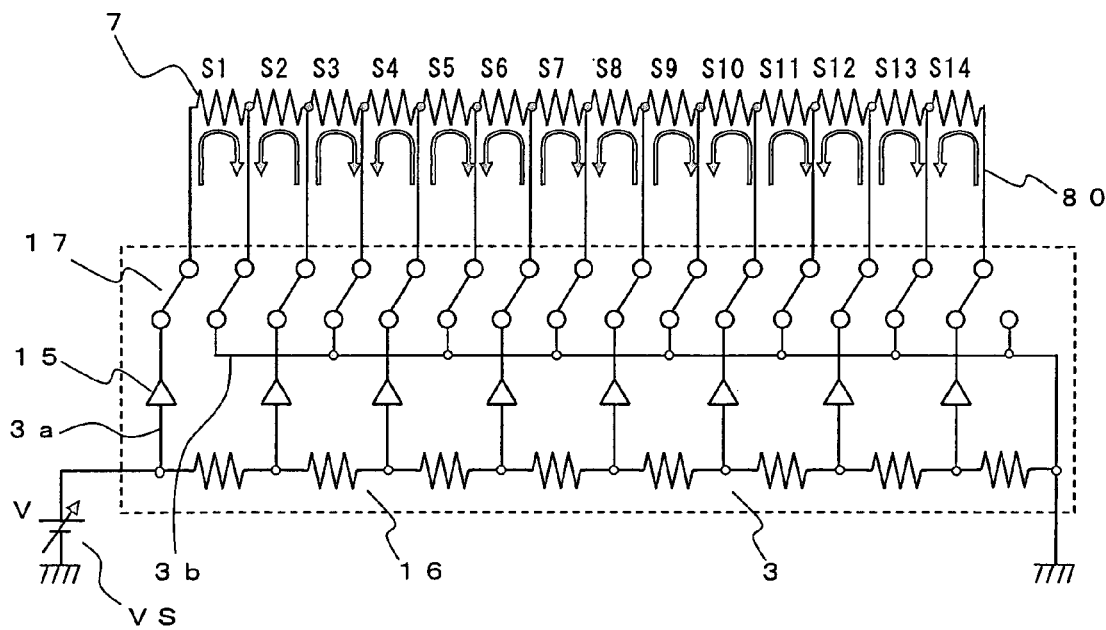
FIGS. 13A and 13B show equivalent circuits of a thin film heater and an operation of a control circuit according to Embodiment 3 of the present invention.
Figure 13B:
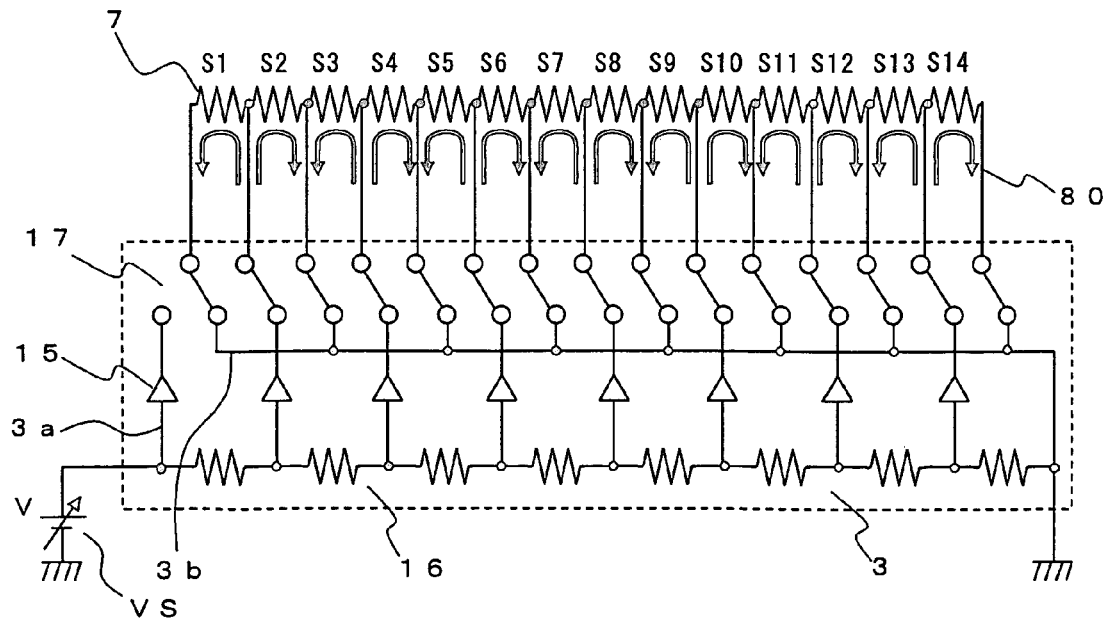

FIGS. 13A and 13B show an equivalent circuit of the thin film heater 7 of the fiber grating unit 1 and a control circuit 3 of this embodiment. The same parts as those of each of the embodiments and parts corresponding thereto are indicated by the same reference symbols. In this embodiment, a case where a different voltage value is applied for each ½ period will be described as in Embodiment 1. FIG. 13A shows a state during the time region "A" and FIG. 13B shows a state during the time region "B". The two states are switched by switching between a wiring circuit 3a for applying voltages and a wiring circuit 3b for connecting the thin film heater 7 with a ground (GND) potential terminal by a switch 17. Directions and levels of currents flowing through respective virtual divisional heater elements of the thin film heater 7 are changed. The control circuit 3 includes voltage sources 15, resistors 16, and the switch 17. Each of the voltage sources 15 outputs a voltage proportional to an inputted voltage. A voltage V outputted from a variable power source VS is divided by each of the resistors 16 and a voltage value determined by each voltage dividing ratio is inputted to each of the voltage sources 15. Assume that all the resistors 16 have the same resistance value. In this case, the voltage inputted to each of the voltage source 15 is proportionally divided, so that a voltage value outputted from each of the voltage sources 15 is linearly changed in order from an end (voltage value from each of the voltage sources 15 is changed in arrangement order at the same rate). When each of the resistors 16 is a variable resistor, it is possible to output the voltages for obtaining an arbitrary temperature distribution, for example, voltage values for suppressing a group delay ripple of the fiber grating and a variation in thin film heater. To explain it simply, a case where all the resistors 16 have the same resistance value will be described. Because all the resistors 16 have the same resistance value, a voltage linearly changed according to a position is outputted from each of the voltage sources 15. When the voltage value V from the variable power source VS is adjusted, a gradient of the voltages outputted from the respective voltage sources 15 can be changed, so that the temperature gradient of the thin film heater 7 can be changed to control the dispersion. The switching control of the switch 17 and the voltage change control of the variable power source VS are performed by the controller 4.

FIG. 14 is a time chart showing a waveform of a voltage applied to each of the regions S1 to S14 separated by the wiring patterns 8 of the thin film heater 7. The voltage is applied based on a controlled voltage value. The waveform of the voltage is changed for each ½ period. The voltage applied for the time region "A" is obtained from the circuit shown in FIG. 13A and the voltage applied for the time region "B" is obtained from the circuit shown in FIG. 13B. As in Embodiment 1, one period is approximately 1 milliseconds to 50 milliseconds. Voltage switching between the time region "A" and the time region "B" is performed by the switch 17. As is apparent from FIG. 14, although the voltage is applied for the entire period including the time region "A" and the time region "B", a level of an applied voltage decreases from the region S1 to the region S14.

Figure 15A:
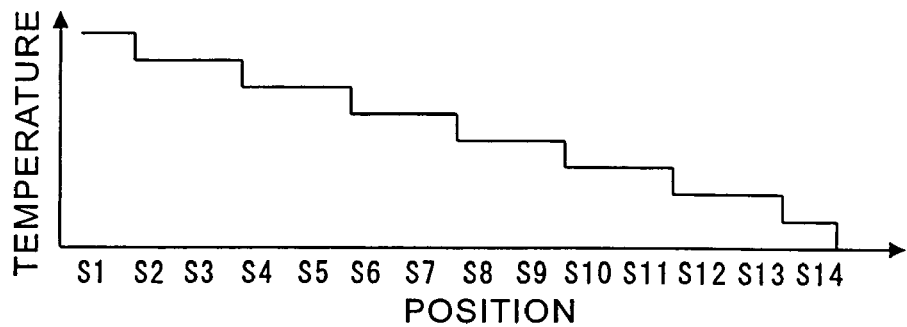
FIGS. 15A, 15B, and 15C show temperature distributions applied to the fiber grating in a case where the power is applied as shown in FIG. 14.
Figure 15B:
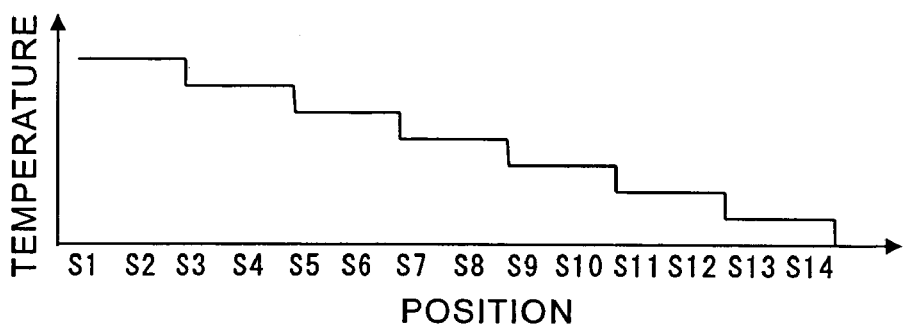
Figure 15C:
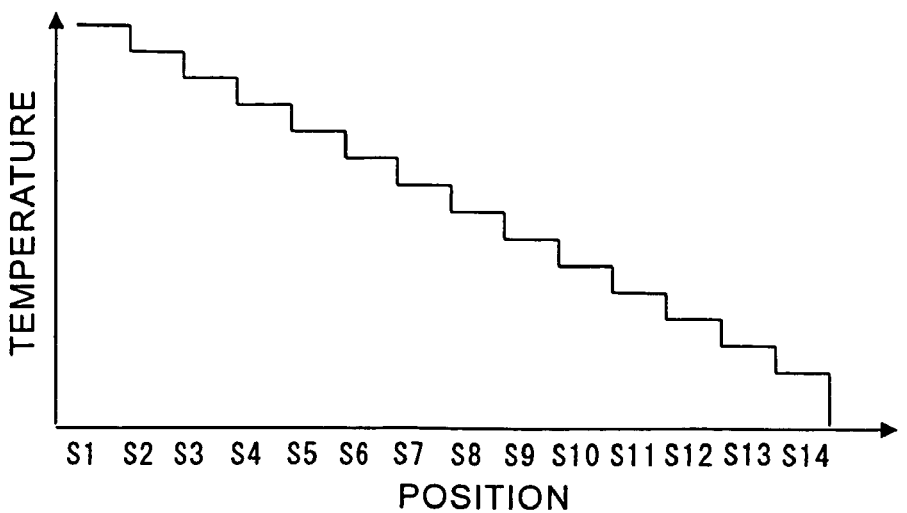

FIGS. 15A, 15B, and 15C show temperature distributions of the thin film heater 7 in a case where the voltage waveform shown in FIG. 14 is applied. To be exact, a heat quantity of the thin film heater 7 is proportional to the square of the voltage. Although the temperature is not linearly changed as shown in FIGS. 15A, 15B, and 15C, it is linearly shown to explain it simply. In an actual case, a variable resistor is used as each of the resistors 16. While the temperature distribution of the thin film heater 7 is measured or while the group delay time characteristic of the fiber grating 6 is measured, a resistance value of each of the resistors 16 is adjusted. Therefore, the temperature distribution of the thin film heater 7 can be easily made linear. FIG. 15A shows a temperature distribution produced by the voltages for the time region "A" shown in FIG. 14. FIG. 15B shows a temperature distribution produced by the voltages for the time region "B" shown in FIG. 14. The voltage period is a period sufficiently small than the time constant of the thin film heater 7, which is approximately 1 milliseconds to 50 milliseconds. Therefore, an actual temperature distribution of the thin film heater 7 becomes the temperature distribution as shown in FIG. 15C, which is a combination of the temperature distributions shown in FIGS. 15A and 15B without the repetition therebetween. Thus, even when not the duty ratio of the applied voltage but the voltage value thereof is controlled, the same temperature distribution as that of Embodiment 1 is obtained, so that the temperature distribution applied to the fiber grating 6 can be controlled to control the group delay time characteristic.

In this embodiment, the applied voltage is changed for each ½ period. The period for changing the voltage is not limited to the ½ period and thus may be an arbitrary period such as a ⅓ period or a ¼ period. The one period may be divided into a plurality of sub periods at an arbitrary time ratio and with an arbitrary number. In this case, it is complicated to adjust power applied for each of the sub periods. Thus, as described in this embodiment, it is simple to set the ½ period. Even when the wiring patterns 8 are alternately connected with the ground (GND) potential terminal to apply the voltages as described in Embodiment 2, the temperature distribution can be controlled as embodiment 2 to control the group delay time characteristic. In such a case, there is no specific period for applying the voltages, so that the voltages are continuously applied. Only when the group delay time characteristic is to be changed, the voltage values may be adjusted.

Embodiment 4

In each of the above embodiments, the description has been made on the tunable dispersion compensator in which the single thin film heater formed along the fiber grating on the substrate is provided as heating means. Hereinafter, an example of a tunable dispersion compensator in which heating means having another structure and a chirped grating are provided according to this embodiment will be described. A fundamental structure of the entire tunable dispersion compensator is identical to that shown in FIG. 1. A chirped grating unit 1a is provided instead of the fiber grating unit 1.

Figure 16:
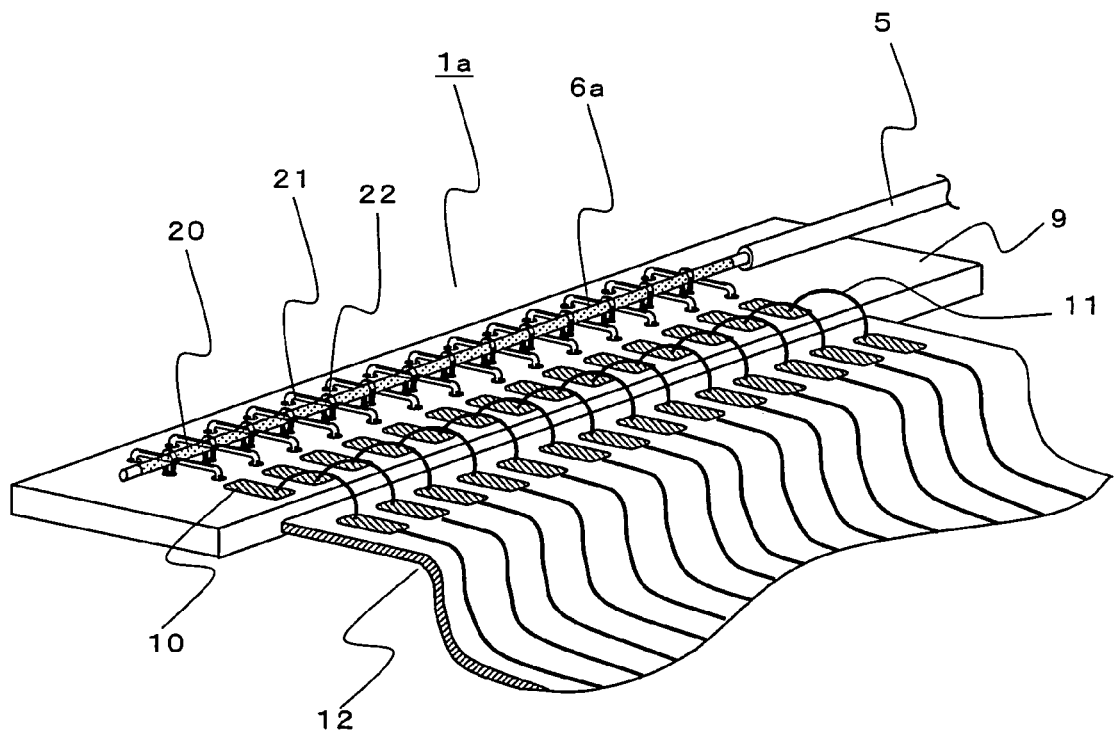
FIG. 16 is a perspective view showing a chirped grating unit according to Embodiment 4 of the present invention.
Figure 17:
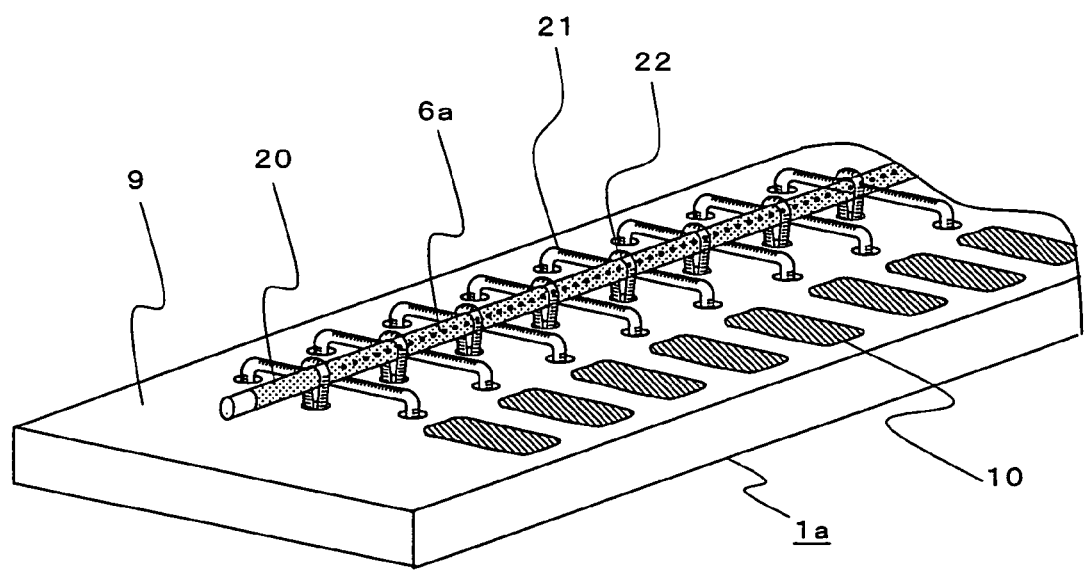
FIG. 17 is an enlarged perspective view showing a part of the chirped grating unit according to Embodiment 4 of the present invention.
Figure 18:
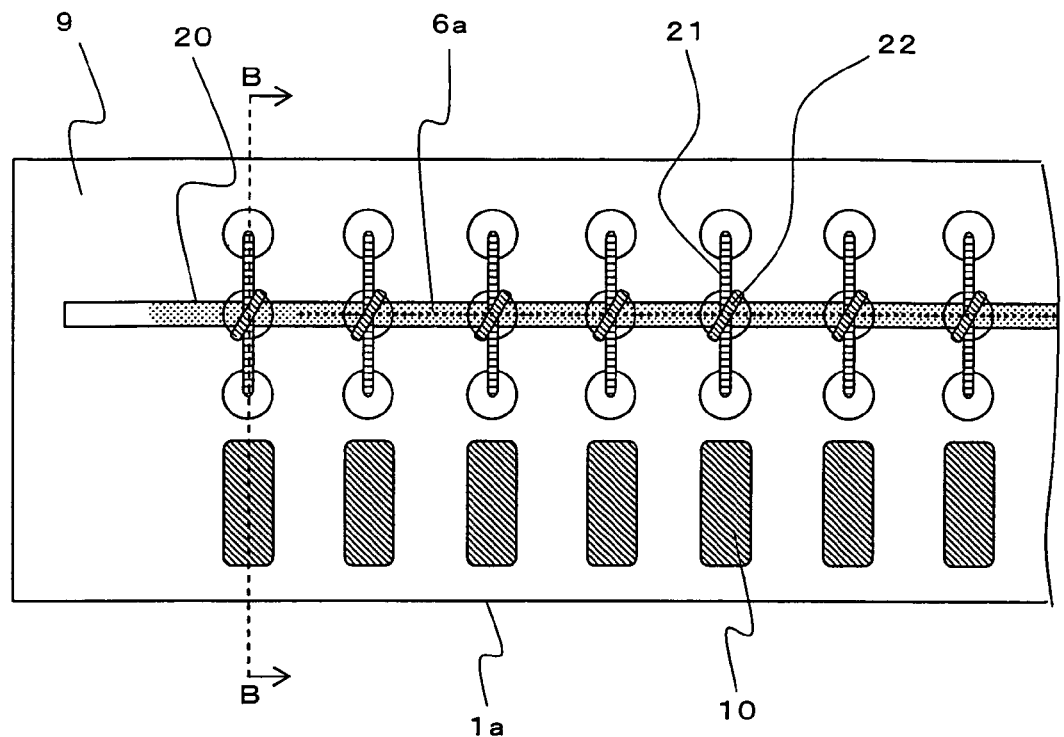
FIG. 18 is a top view showing the chirped grating unit according to Embodiment 4 of the present invention.
Figure 19:
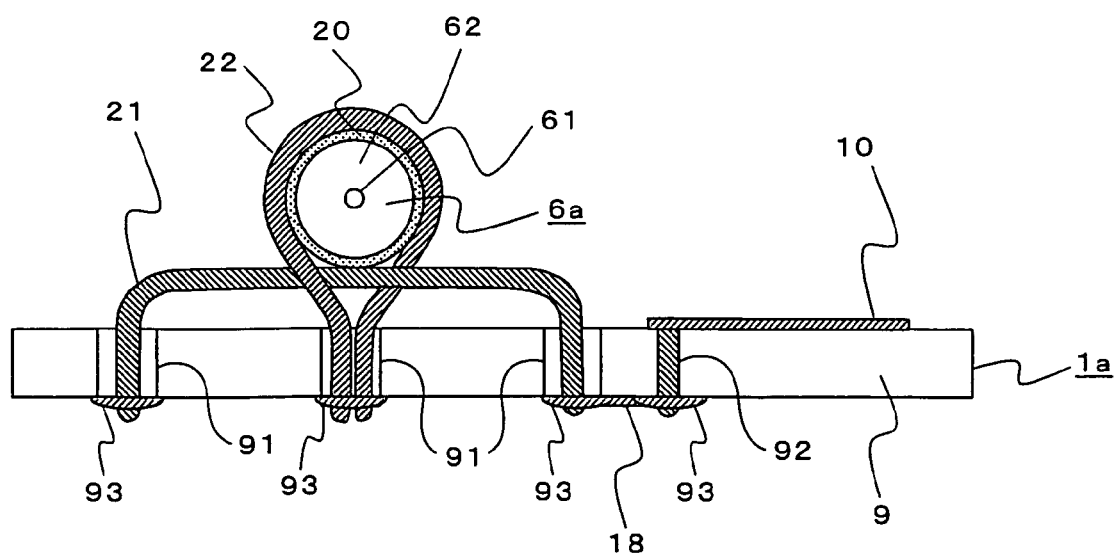
FIG. 19 is a cross sectional view showing the chirped grating unit according to Embodiment 4 of the present invention.

FIG. 16 is a perspective view showing the chirped grating unit 1a of the tunable dispersion compensator according to Embodiment 4 of the present invention. FIG. 17 is an enlarged perspective view showing a part of the chirped grating unit 1a. FIG. 18 is a top view showing the chirped grating unit 1a. FIG. 19 is a cross sectional view taken along a broken line "B" shown in FIG. 18. The same parts as those in each of the embodiments and parts corresponding thereto are indicated by the same reference symbols. The chirped grating unit 1a has the following structure. A chirped grating 6a (grating portion) whose refractive index period changes in the longitudinal direction is formed at a length of 40 mm in a portion of the optical fiber 5 in which a coating is removed. A metal film 20 is formed at a substantially uniform thickness by electroless nickel plating so as to coat the entire chirped grating 6a. As in each of the embodiments, assume that the chirped grating 6a is constructed of a core (see, for example, reference numeral 61 of FIG. 19) on which the chirped grating is formed and a clad (see, for example, reference numeral 62 of FIG. 19) for coating the circumference side surface of the core. A plurality of metal wires 21 such as tin-plated copper wires are provided in substantially parallel on the substrate 9 made of, for example, glass epoxy. As shown in FIG. 19, each of the metal wires 21 extending through a through hole 91 is electrically connected with the corresponding electrode pad 10 through a wiring pattern 18 located on the rear surface side of the substrate 9 and a connection portion extending through a through hole 92. The chirped grating 6a located on the plurality of metal wires 21 is fixed so as to hold from the top by a plurality of fixing metal wires 22 extended from the rear surface side of the substrate 9 through the through holes 91. Therefore, the metal wires 21 are in close contact with the metal film 20 formed on the chirped grating 6a, thereby performing positioning. The metal wires 21 and the fixing metal wires 22 are fixed by, for example, solders 93 on the rear surface side of the substrate 9.

In this embodiment, the length of the chirped grating 6a is set to 40 mm. However, the present invention is not limited to this length and thus arbitrary length may be set. It is only necessary to coat the entire chirped grating 6a with the metal film 20. Therefore, for example, the metal film 20 may be extended to a region having an excessive length which exceeds the length of the chirped grating 6a or extended to a coating portion of the optical fiber. The metal film 20 is a nickel film formed by electroless plating. The metal film 20 may be a metal film formed by another method, for example, vacuum plating such as sputtering or evaporation. Each metal has a specific resistance, so a kind of metal is not limited. Another conductive film such as a carbon film, except for the metal film may be used. The metal film 20 may be constructed of a plurality of layers formed by performing gold plating on the nickel film formed by the electroless plating.

The number of metal wires 21 may be arbitrary. It is desirable to provide the metal wires 21 in intervals of 0.1 to 1 mm, preferably, approximately 0.5 mm in a region having a length which exceeds the entire length of the chirped grating 6a. The metal wires 21 are not necessarily provided in regular intervals. For example, the metal wires 21 may be provided in irregular intervals such that intervals in a central portion of the fiber grating 6 are substantially equal to one another and intervals in both end portion thereof are wider than the center portion. The substrate 9 may be made of an insulating material such as glass epoxy, glass, quartz, or plastic. For example, when the surface of each of the metal wires 21 is coated with an insulating film to be able to ensure the insulation between the adjacent metal wires 21, metal may be used for the substrate 9. Each of the fixing metal wires 22 is not limited to a metal wire and thus may be a thread made of, for example, a resin having a heat resistance of approximately 100° C.

Figure 20:
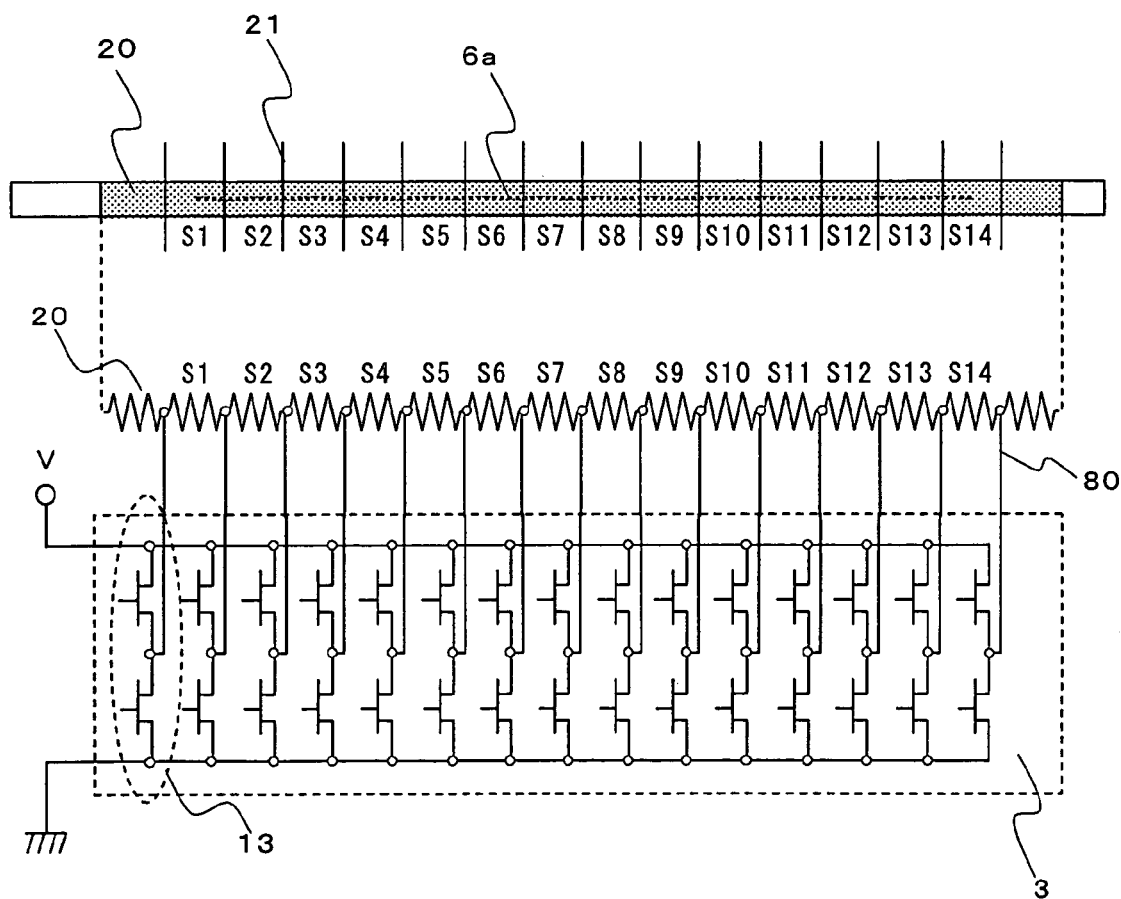
FIG. 20 shows a model of a metal film, an equivalent circuit thereof, and a control circuit according to Embodiment 4 of the present invention.

Next, the operation of the tunable dispersion compensator according to the present invention will be described. FIG. 20 shows a model of the chirped grating 6a, an equivalent circuit thereof, and the control circuit 3. In the equivalent circuit, the metal film 20 formed on the circumference side surface of the chirped grating 6a is indicated by resistor symbols. Regions of the metal film 20 which are separated by the metal wires 21 are indicated by symbols of S1 to S14. Here, the number of regions of the metal film 20 which are separated by the metal wires 21 is set to 14. When the metal wires 21 are actually arranged in intervals of 1 mm in the chirped grating 6a having the length of 40 mm, the number of regions becomes 40 or more. The reason why "or more" is used is as follows. When the regions separated by the metal wires 21 arranged in the intervals of 1 mm are provided over at least the entire length of the chirped grating 6a, the minimum number of regions is 40. In addition, the metal wires 21 are provided in a region having a length which exceeds the entire length of the chirped grating 6a, so that the number of regions can be set to 41 or more. A wiring 80 indicates a wiring which includes the metal wire 21, the wiring pattern 18, the through hole 92, the electrode pad 10, the wire 11, and the cable 12 and which is located between the metal wire 21 and the control circuit 3.

Figure 21:
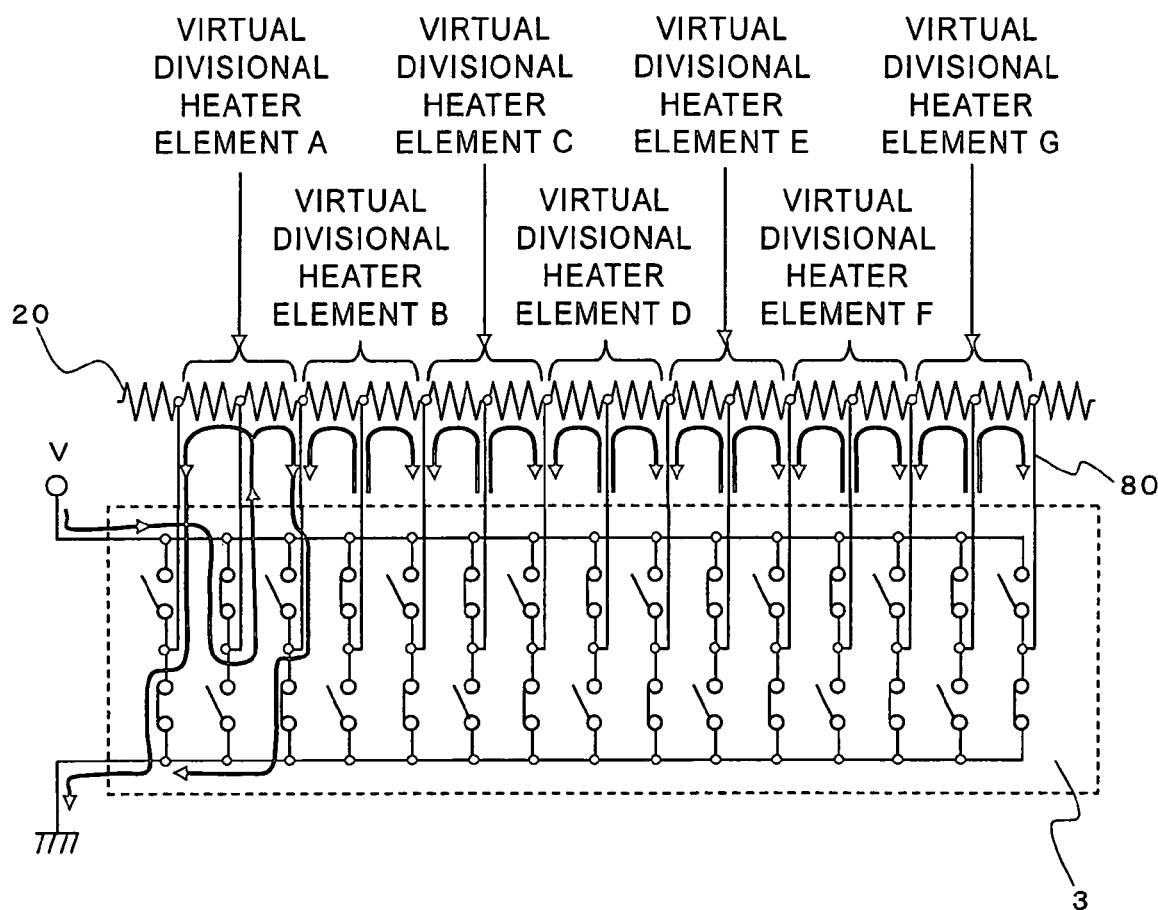
FIG. 21 shows the equivalent circuit of the metal film and an operation of the control circuit according to Embodiment 4 of the present invention.
Figure 22:
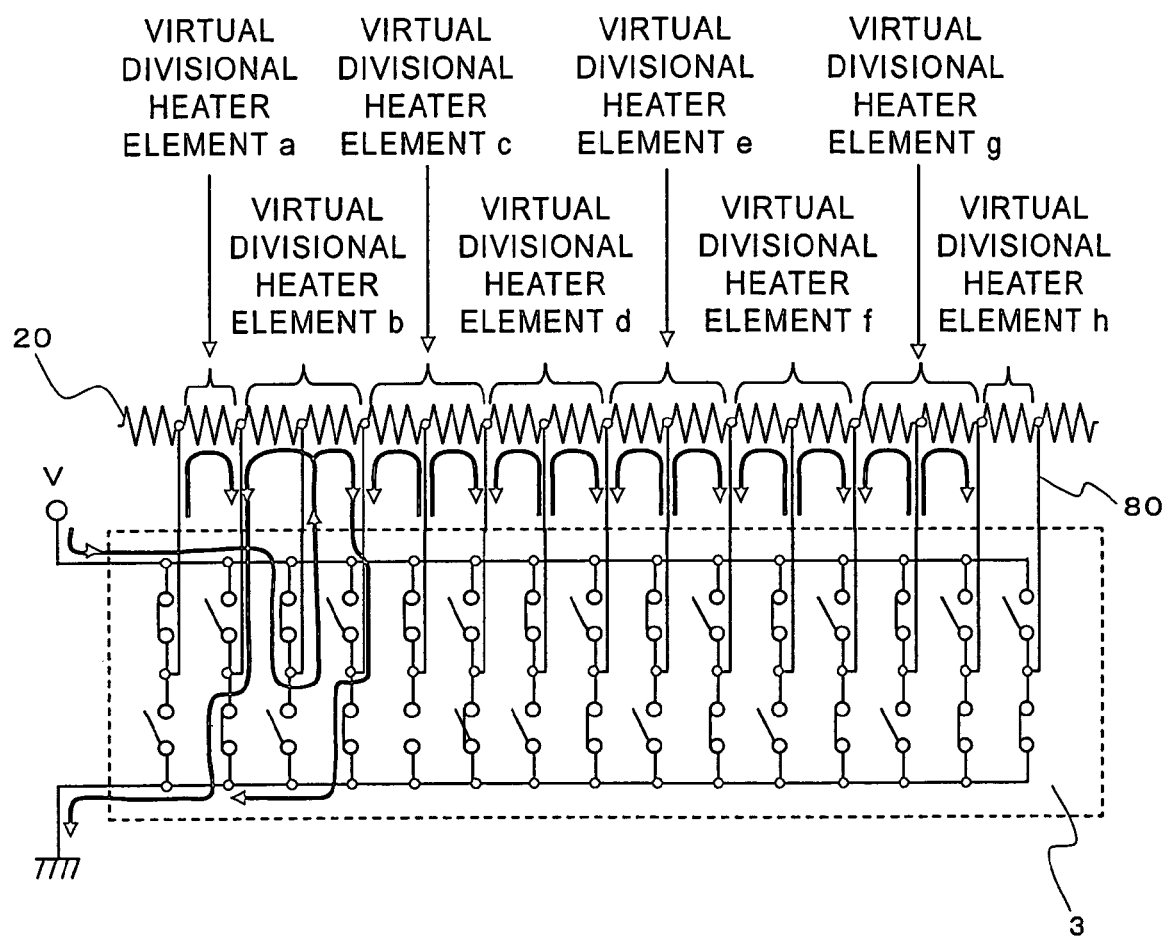
FIG. 22 shows the equivalent circuit of the metal film and the operation of the control circuit according to Embodiment 4 of the present invention.

The control circuit 3 includes push-pull type transistor circuits 13, each of which is formed of two transistors such as bipolar transistors or field effect transistors. The transistor circuits 13 are connected with the respective metal wires 21. A fundamental structure and a fundamental operation of the control circuit 3 are identical to those shown in FIG. 4. The voltage V is applied between the two transistors of each of the transistor circuits 13. When one of the two transistors of each of the transistor circuits 13 is turned ON and the other thereof is turned OFF, the voltage V or the ground (GND) potential is applied to each of the metal wires 21. FIGS. 21 and 22 show the operation of the transistor circuits 13 and a current flow state in the case where the voltage V and the ground (GND) potential are alternately applied to the respective metal wires 21. FIGS. 21 and 22 correspond to FIGS. 5 and 6. As shown in FIGS. 21 and 22, each current flows from the metal wire 21 to which the voltage V is applied into the metal film 20 and then flows out from the metal wire 21 to which the ground (GND) potential is applied. Therefore, the regions of the metal film 20 singly formed on the circumference side surface of the chirped grating 6a are separated by the metal wire 21 to which the ground (GND) potential is applied, so the regions can be operated as virtual divisional heater elements. The virtual divisional heater elements are indicated as virtual divisional heater elements "A" to "G" shown in FIG. 21. In addition, the virtual divisional heater elements are indicated as virtual divisional heater elements "a" to "h" shown in FIG. 22. In FIG. 22, one end of the virtual divisional heater element "a" becomes the ground (GND) potential and the other end thereof becomes the applied voltage V. However, a region of the metal film which is located outside the virtual divisional heater element "a" is not connected with the metal wire 21, so a current does not flow. Therefore, the region shown in FIG. 22 becomes the virtual divisional heater element "a". A power applying method used for the case where a temperature distribution having a linear temperature gradient is applied to the chirped grating 6a is identical to that described in Embodiment 1 with reference to FIGS. 7, 8A, 8B, and 8C and thus the description of the method is omitted here.

Figure 23:
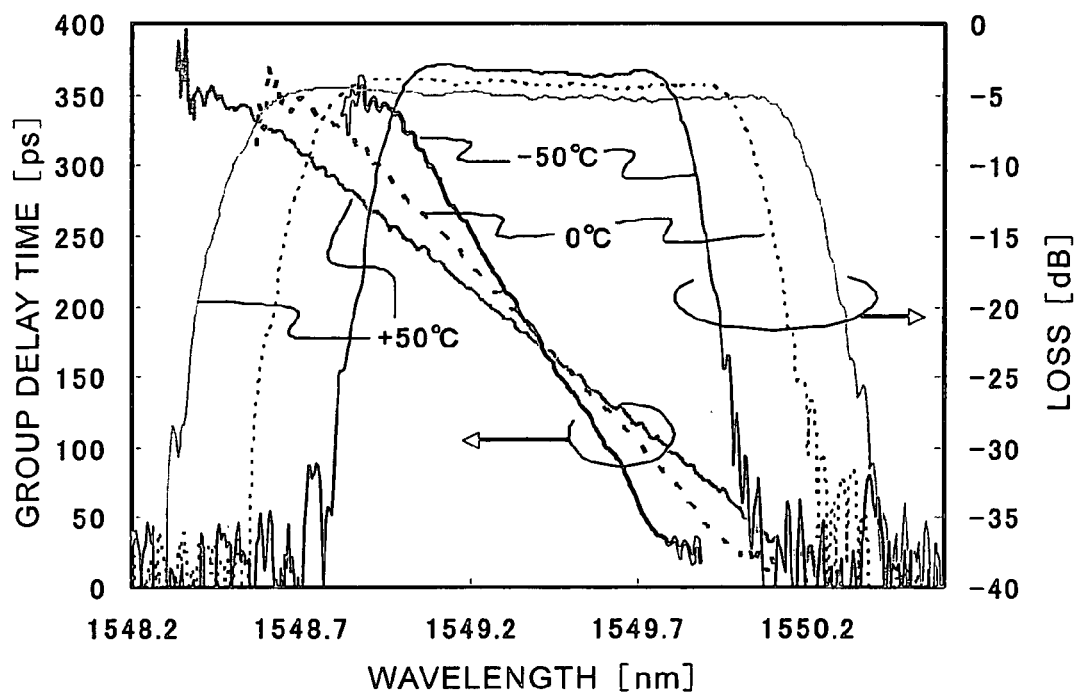
FIG. 23 shows a group delay time characteristic and a loss characteristic of a tunable dispersion compensator according to Embodiment 4 of the present invention.

FIG. 23 shows changes in group delay time characteristic and loss characteristic in the case where the temperature gradient changes in the tunable dispersion compensator using the chirped grating 6a having the length of 40 mm according to the present invention. In FIG. 23, each of −50° C., 0° C., and +50° C. indicates the degree of a temperature gradient which may be actually applied to the chirped grating. The applied power is adjusted so as to obtain the group delay time characteristic caused in the case where each of the temperature gradients is theoretically applied. As in the case shown in FIG. 9, the temperature gradient of −50° C. is a downward linear temperature gradient and indicates that a temperature difference between both ends of the chirped grating 6a is 50° C. The temperature gradient of +50° C. is an upward linear temperature gradient. Note that input and output ends of the chirped grating 6a are located on the right side. The temperature gradient of 0° C. corresponds to a linear temperature distribution in which the temperature difference between both the ends of the chirped grating 6a is 0° C., that is, indicates that a predetermined temperature distribution is applied to the entire chirped grating. In the case of each of −50° C., +50° C., and 0° C., a temperature at the center of the chirped grating is maintained to be substantially a predetermined temperature. Therefore, the respective group delay time characteristics intersect with one another at the center wavelength. Thus, even in the case of the structure of the tunable dispersion compensator according to the present invention, the group delay time characteristic can be controlled by the temperature gradient control as in the case of the conventional tunable dispersion compensator.

In this embodiment, the case where the dispersion of the chirped grating is controlled by the application of the linear temperature gradient is described. The temperature distribution to be applied is not limited to the linear temperature distribution. A quadratic function type temperature distribution may be applied to change the dispersion slope of the chirped grating. The temperature distribution may be an arbitrary temperature distribution. It is also possible to apply a temperature distribution for canceling a group delay ripple specific to the chirped grating. That is, it is possible to apply the same temperature distribution as that in the conventional tunable dispersion compensator in which the plurality of heater elements are provided around the circumference side surface of the chirped grating to control the temperature distribution.

Figure 24:
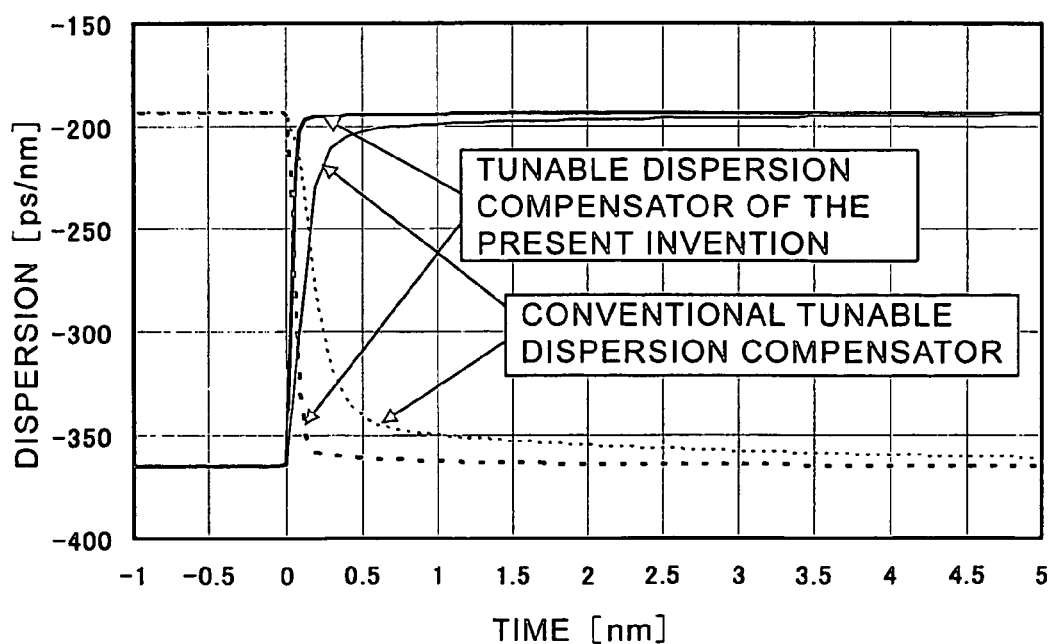
FIG. 24 shows a response characteristic of the tunable dispersion compensator according to Embodiment 4 of the present invention and a response characteristic of a conventional tunable dispersion compensator at a time of dispersion change.

FIG. 24 shows a response characteristic of the tunable dispersion compensator according to the present invention and a response characteristic of a conventional tunable dispersion compensator at the time of dispersion change. A change in dispersion value with time in the case where the dispersion is changed from −193 ps/nm to −364 ps/nm is measured. In addition, a change in dispersion value with time in the case where the dispersion is changed from −364 ps/nm to −193 ps/nm is measured. In the conventional tunable dispersion compensator, the thickness of a quartz substrate is set to 0.1 mm. In the case of −193 ps/nm, the temperature gradient of +60° C. is applied. In the case of −364 ps/nm, the temperature gradient of −60° C. is applied. Instant switching between the temperature gradients is performed for the measurement. A measurement device for measuring such a high-speed change in dispersion characteristic is not available. Therefore, the inventor(s) of the present invention performs the measurement using the following method. While the temperature gradient is changed at each of 10 or more wavelengths within a wavelength band of the tunable dispersion compensator, a change in group delay time with time is measured. This can be measured using an available dispersion measurement device. The group delay times at 10 or more wavelengths which are measured by temperature gradient switching are plotted based on group delay time data obtained at the same time on a graph whose abscissa indicates a wavelength and ordinate indicates a group delay time. The dispersion at the time is obtained from the gradient of the graph. This is performed for each measurement time, thereby obtaining a change in dispersion characteristic with time. A known method of measuring a high-speed change in dispersion characteristic with time is, for example, a method using a dispersion monitoring technique (for example, OECC/CONI2004, Technical Digest, 14C2-2, pp. 458-459).

As is apparent from FIG. 24, a response time of the change in dispersion is approximately 0.5 seconds in the conventional tunable dispersion compensator. On the other hand, the response time is 0.2 seconds or less in the tunable dispersion compensator according to the present invention. The power consumption is approximately 1.2 W and equal to or lower than that of the conventional tunable dispersion compensator. Unlike the conventional tunable dispersion compensator, the response time of the change in dispersion can be further shortened without an increase in power consumption.

Next, a method of manufacturing the tunable dispersion compensator according to the present invention will be briefly described. A technique for forming a chirped grating in an optical fiber and a technique for forming a metal film in the optical fiber each are not a novel technique, so a conventional technique can be used. Here, the techniques will be briefly described.

First, an optical fiber cable is left in a hydrogen or heavy hydrogen atmosphere at the order of 120 atmospheric pressure for approximately two weeks, so that an inner portion of the optical fiber is filled with hydrogen or heavy hydrogen. This is normally called high-pressure hydrogen processing and used to improve photosensitivity to ultraviolet irradiation performed while the grating is manufactured. An easy-to-use optical fiber cable is an optical fiber cable having a diameter of 250 μm in which a single mode optical fiber having a diameter of 125 μm is coated with a resin.

When the high-pressure hydrogen processing is performed to fill the inner portion of the optical fiber with hydrogen or heavy hydrogen, the optical fiber cable is taken out and a part of a coating thereof, that is, at least a part in which the chirped grating is formed is removed.

After that, a chirped phase mask serving as a kind of diffraction grating is located close to the removed part of the coating. The removed part is irradiated with an ultraviolet laser beam through the chirped phase mask. The ultraviolet laser beam is divided into ±1-order diffraction beams by the chirped phase mask. Then, an interference pattern is caused in the core of the optical fiber by the ±1-order diffraction beams, with the result that a change in refractive index which corresponds to the interference pattern occurs. The change in refractive index exhibits a grating. A pitch of the interference pattern caused in the core of the optical fiber by the chirped phase mask changes in the longitudinal direction of the optical fiber, so a pitch of the grating also changes. This is a chirped grating.

After the chirped grating is formed in a part of the optical fiber cable, the metal film is formed on the circumference side surface of the chirped grating. Here, a metal film forming method using electroless nickel plating will be described. The metal film can be also formed by vacuum plating such as sputtering or evaporation. First, in order to perform degreasing processing, the part of the optical fiber in which the chirped grating is formed is immersed into a bath containing a surface active agent (15 g/liter) at 50° C. for five minutes. When the part of the optical fiber is to be immersed into the bath, not only the part in which the coating is removed but also a part of the optical fiber cable in which the coating is not removed may be immersed.

Next, after the part of the optical fiber is to be immersed into a bath including an unsaturated alcohol solution containing 2-butyne-1,4-diol (5.0 g/liter) at 25° C. for five minutes, palladium processing is performed to adsorb palladium serving as the core of electroless nickel plating to a part to be plated. In the palladium processing, the part of the optical fiber is immersed into a bath including a catalytic solution containing palladium chloride (0.1 g/liter) and 36% hydrochloric acid (3.0 g/liter) at 25° C. for five minutes.

After that, in order to perform electroless nickel plating, the part of the optical fiber is immersed for five minutes into an electroless plating bath (80° C. and pH 4.5) containing nickel sulfate hexahydrate (27 g/liter), hypophosphorous acid (13 g/liter), malic acid (15 g/liter), succinic acid (3.0 g/liter), and lead nitrate (0.8 g/liter).

Then, the optical fiber cable subjected to the electroless nickel plating is heated at 150° C. for 30 minutes. The thickness of the nickel film formed on the circumference side surface of the chirped grating is approximately 0.3 μm. Therefore, the metal film can be very simply formed on the circumference side surface of the chirped grating by the electroless nickel plating, so that mass productivity is improved and a reduction in cost is realized.

Figure 25:
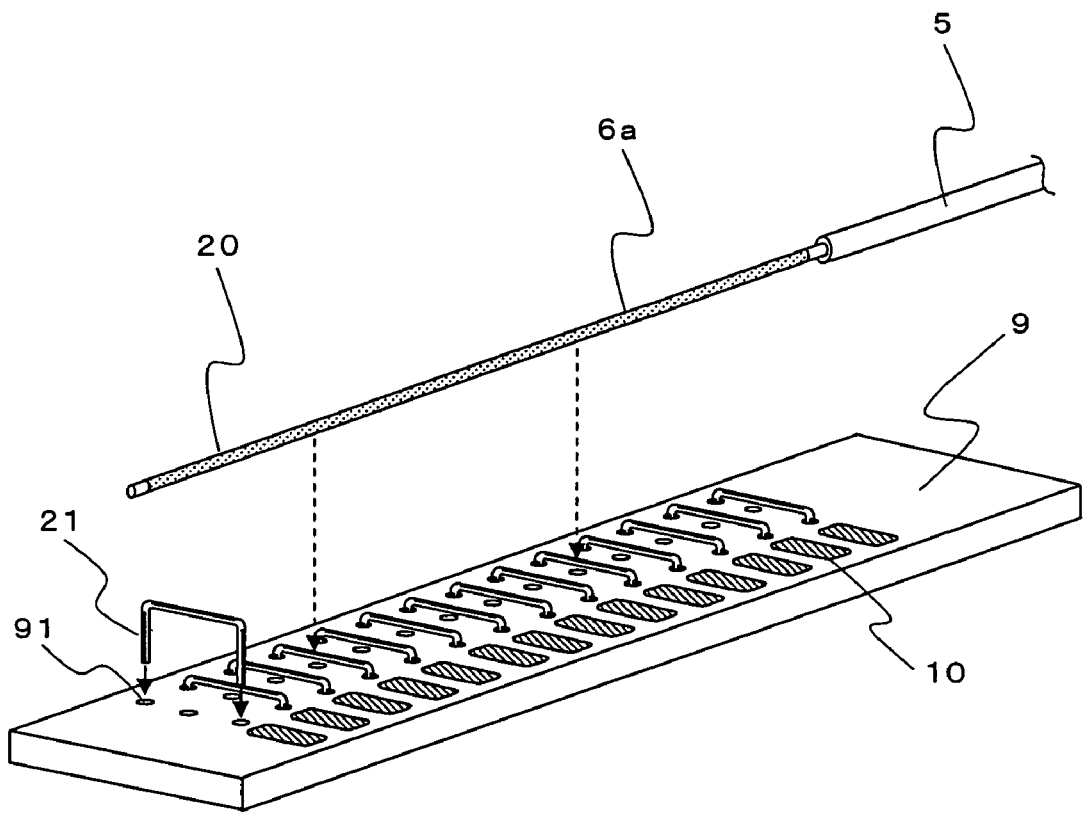
FIG. 25 shows a method of manufacturing the chirped grating unit according to Embodiment 4 of the present invention.
Figure 26:
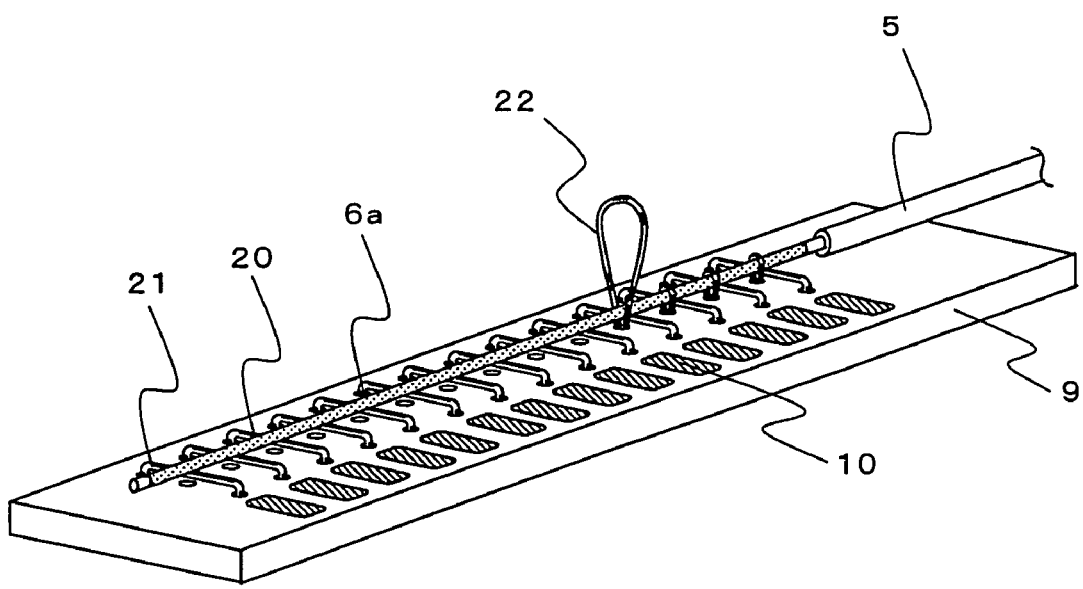
FIG. 26 shows the method of manufacturing the chirped grating unit according to Embodiment 4 of the present invention.

The chirped grating on which the metal film is formed as described above is mounted on the substrate to manufacture the chirped grating unit. FIGS. 25 and 26 show a method of manufacturing the chirped grating unit. First, as shown in FIG. 25, the plurality of metal wires 21 are attached to the substrate 9 and the chirped grating 6a is located on the metal wires 21. As shown in FIG. 19, the through holes 91 through which the metal wires 21 and the fixing metal wires 22 extend and the through holes 92 for the electrode pads 10 are formed in advance in the substrate 9. The electrode pads 10 are formed on the front surface side of the substrate 9 and the wiring patterns 18 are formed on the rear surface side thereof. If necessary, metal pads (through holes) and the like are formed around the holes. Such a structure is produced during, for example, a normal printed board manufacturing process.

After the metal wires 21 extends through the through holes 91 formed in the substrate 9, the metal wires 21 are fixed on the rear surface side by soldering (see reference numeral 93 of FIG. 19) or the like. Therefore, the metal wires 21 are electrically connected with the electrode pads 10.

Figure 27:
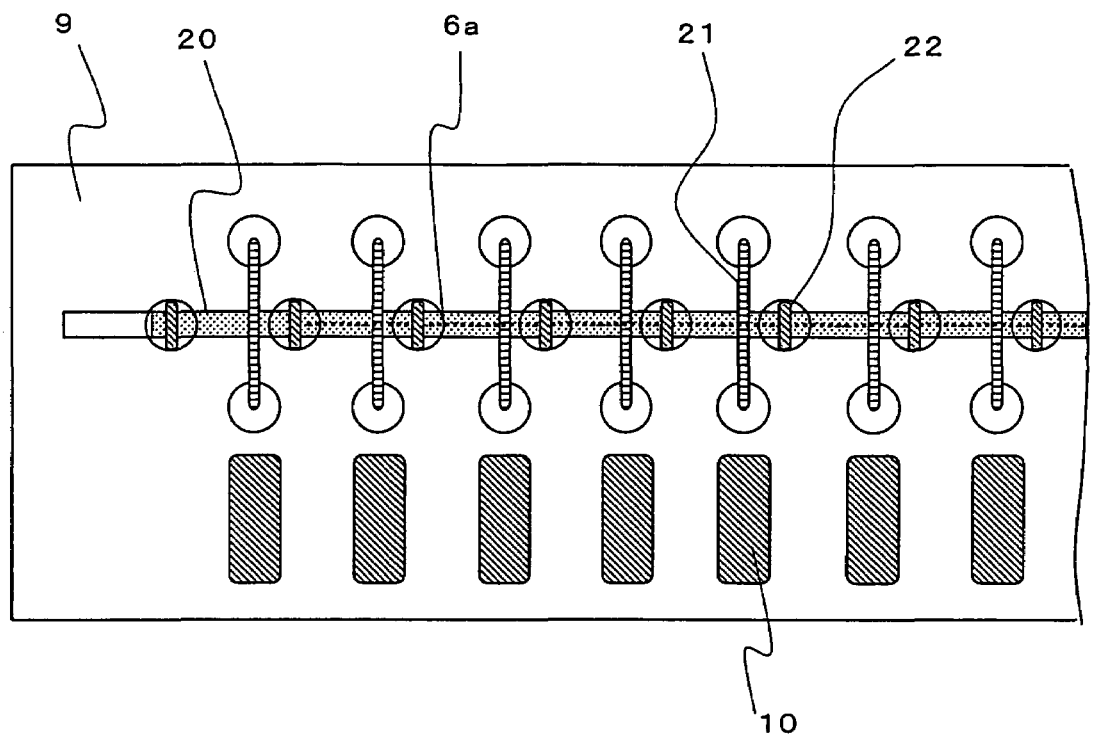
FIG. 27 is a top view showing another chirped grating unit according to Embodiment 4 of the present invention.

Next, the chirped grating 6a on which the metal film 20 is formed is located on the metal wires 21. Then, as shown in FIG. 26, the chirped grating 6a is fixed onto the metal wires 21 by the fixing metal wires 22. The fixing metal wires 22 are fixed on the rear surface side of the substrate 9 by soldering (see reference numeral 93 of FIG. 19) or the like. The chirped grating 6a, the metal wire 21, and the fixing metal wire 22 may be located so as to intersect with one another as shown in FIG. 18. Alternatively, as shown in FIG. 27, the metal wire 21 and the fixing metal wire 22 may be located so as not to intersect with each other. The procedure described here is an example. The procedure may be performed as follows. For example, after the metal wires 21 are located, each of the fixing metal wires 22 is slacked to form a ring and provided in each of the through holes of the substrate 9. The chirp grating 6a is inserted from an end so as to pass through all the formed rings of the fixing metal wires 22. After that, all the fixing metal wires 22 can be pulled from the rear surface side of the substrate 9 to hold the chirp grating 6a as shown in FIG. 17. Although the metal wires 21 are inserted into the through holes of the substrate 9, the metal wires 21 may be integrally formed with the substrate 9.

The metal film 20 formed on the circumference side surface of the chirped grating 6a is further subjected to gold plating, held on the metal wires 21 subjected to tin plating, and heated. As a result, a gold-tin alloy is formed in an interface between a gold plating layer and a tin plating layer, so that electrical connection can be ensured. Heating may be performed by setting in a heating furnace or the like. In order to perform heating, it is simple to supply a current to the metal film 20. A resin protective film or the like may be formed on the circumference side surface of the chirped grating 6a of the chirped grating unit 1 manufactured as described above. In this case, for example, a method using a resin spray or an immersing method using a resin solution is used.

The chirped grating unit 1 manufactured as described above is connected with the control circuit 3 through the cable 12. The control circuit 3 is connected with the controller 4, so that the tunable dispersion compensator is obtained. As described above, the controller 4 includes the memory means such as the ROM for storing data for driving the control circuit 3 based on the dispersion value inputted by a user. Data stored in the ROM of the controller 4 can be separately rewritten after the tunable dispersion compensator is manufactured. Therefore, for example, the metal film 20 formed on the circumference side surface of the chirped grating 6a is uneven or even when the intervals of the metal wires 21 vary, the data written into the ROM are adjusted, so that a temperature distribution for obtaining a characteristic corresponding to the dispersion value can be applied to the chirped grating 6a.

As described above, according to the tunable dispersion compensator according to the present invention, the response time of the change in dispersion can be shortened without an increase in power consumption. The tunable dispersion compensator can be manufactured using a very simple method, so that a reduction in cost is realized.

Embodiment 5

In Embodiment 4, the case where the metal film serving as the heating means is formed on the circumference of the chirped grating has been described. The metal film is not necessarily provided on the circumference of the chirped grating and thus may be provided in a part of the chirped grating. In this embodiment, a tunable dispersion compensator in which the metal film is provided on a part of the chirped grating will be described.

Figure 28:
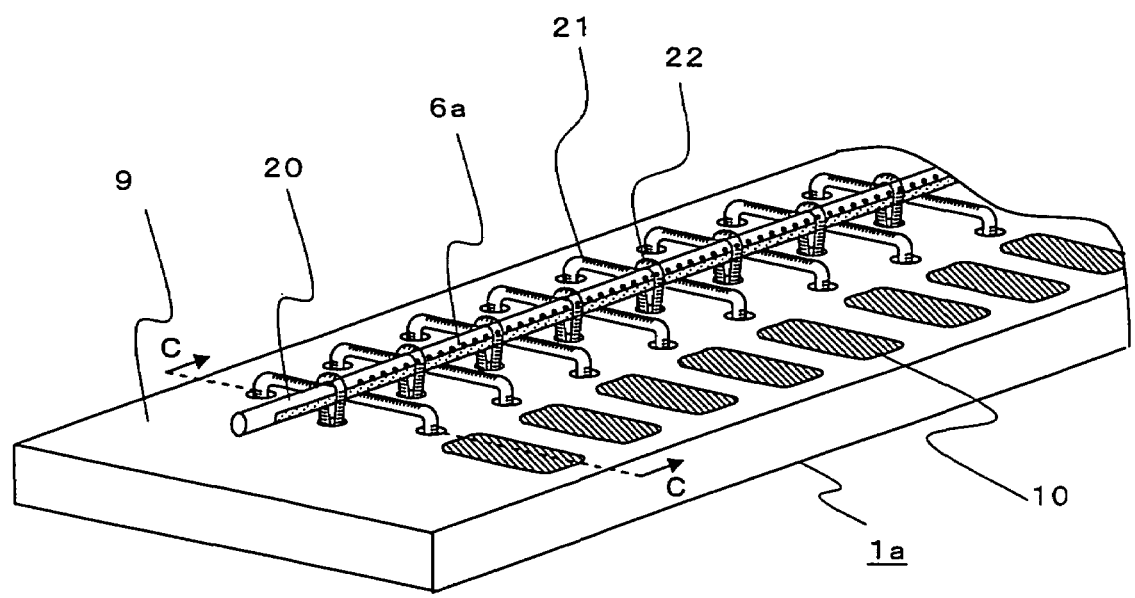
FIG. 28 is an enlarged perspective view showing a part of a chirped grating unit according to Embodiment 5 of the present invention.
Figure 29:
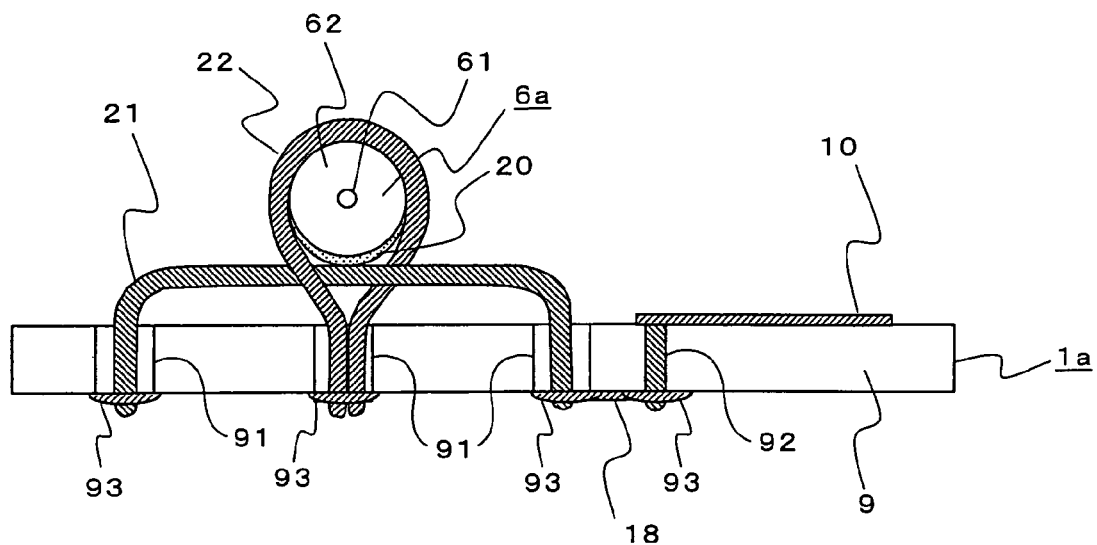
FIG. 29 is a cross sectional view showing the chirped grating unit shown in FIG. 28.

FIG. 28 is an enlarged perspective view showing a part of a chirped grating unit 1a of the tunable dispersion compensator according to Embodiment 5 of the present invention, in which the metal film 20 is provided on not the circumference of the chirped grating 6a but a part of the circumference thereof. FIG. 28 corresponds to FIG. 17 in Embodiment 4. FIG. 29 is a cross sectional view taken along the broken line "C", showing the chirped grating unit 1a shown in FIG. 28. The same parts as those in each of the embodiments and parts corresponding thereto are indicated by the same reference symbols. A structure of a portion which is not shown, of the tunable dispersion compensator is identical to that in Embodiment 4 and the same operation is performed.

In the tunable dispersion compensator according to this embodiment, as shown in FIG. 28, the metal film 20 is provided over the entire length of the chirped grating 6a. Here, as shown in FIGS. 28 and 29, the metal film 20 is provided on not the entire circumference side surface of the chirped grating 6a but a part of the circumference side surface thereof. When a vacuum plating method such as sputtering or evaporation is used, the metal film 20 can be easily formed on only the part of the circumference side surface of the chirped grating 6a. That is, when the optical fiber in which the chirped grating 6a is formed is set into a vacuum chamber and the metal film is to be formed by sputtering, evaporation, or the like, the metal film 20 is normally formed only in one direction (for example, upper direction in the case where the optical fiber is laid). When the chirped grating 6a is fixed onto the metal wires 21 such that the metal film 20 formed on the part of the circumference side surface of the chirped grating 6a as described above is in contact with the metal wires 21, the chirped grating unit 1a can be manufactured.

Embodiment 6

In Embodiment 5, the case where the metal film is formed on the part of the circumference side surface of the chirped grating and then the chirped grating is fixed onto the metal wires 21 to manufacture the chirped grating unit has been described. In this embodiment, a tunable dispersion compensator in which the chirped grating is fixed and then the metal film is formed to manufacture the chirped grating unit will be described.

Figure 30:
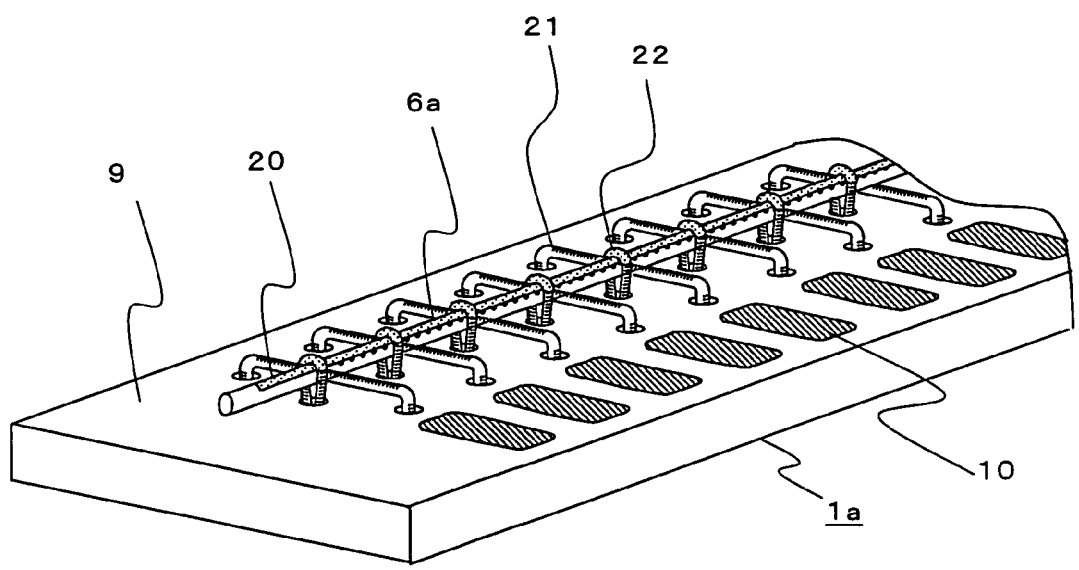
FIG. 30 is an enlarged perspective view showing a part of a chirped grating unit according to Embodiment 6 of the present invention.
Figure 31:
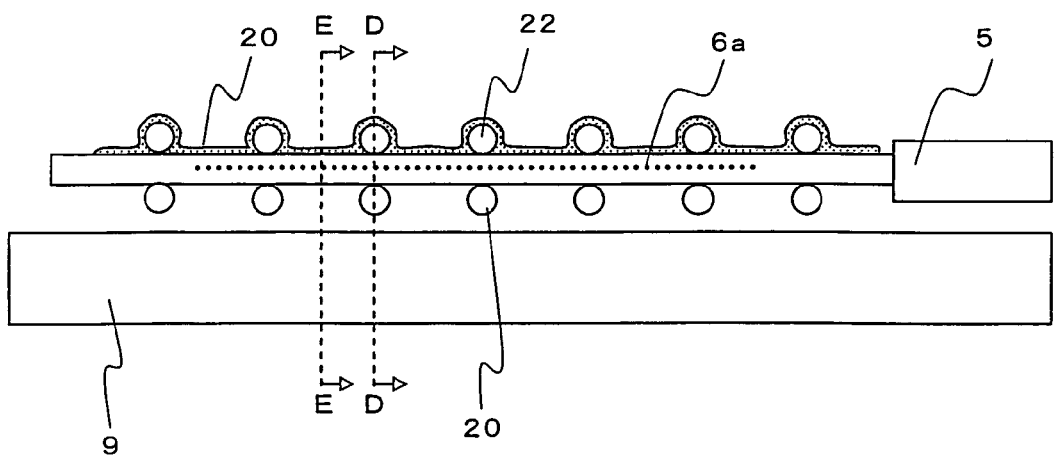
FIG. 31 is a cross sectional view showing the chirped grating unit shown in FIG. 30.
Figure 32A:
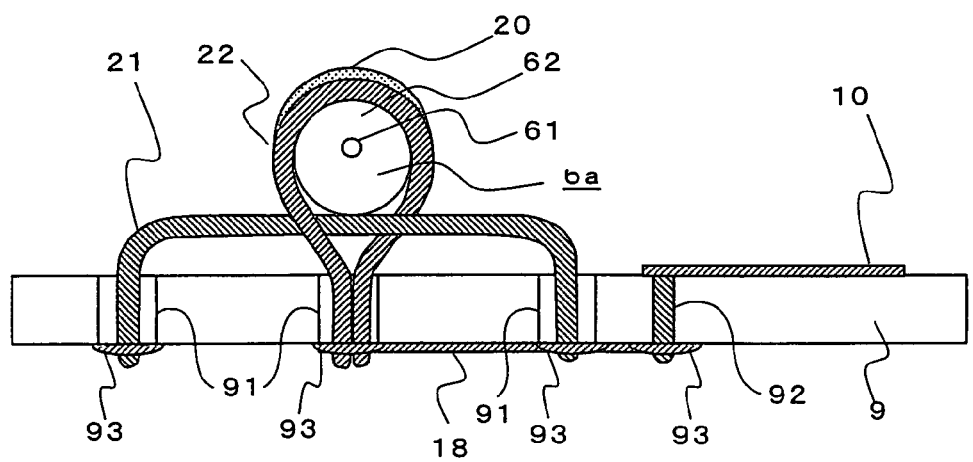
FIGS. 32A and 32B are cross sectional views showing the chirped grating unit shown in FIG. 30.
Figure 32B:
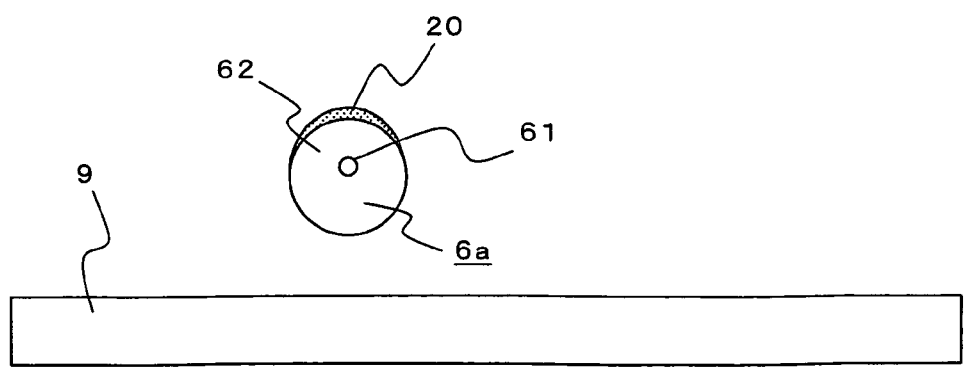

FIG. 30 is an enlarged perspective view showing a part of a chirped grating unit 1a of the tunable dispersion compensator according to Embodiment 6 of the present invention. FIG. 31 is a cross sectional view of the chirped grating 6a shown in FIG. 30 in a longitudinal direction thereof. FIG. 32A is a cross sectional view taken along the broken line "D" shown in FIG. 31. FIG. 32A is a cross sectional view taken along the broken line "D" shown in FIG. 31. FIG. 32B is a cross sectional view taken along the broken line "E" shown in FIG. 31. The same parts as those in each of the embodiments and parts corresponding thereto are indicated by the same reference symbols. The chirped grating unit 1a of the tunable dispersion compensator is manufactured as follows.

The optical fiber 5 in which the chirped grating 6a is formed is located on the metal wires 21 without forming the metal film 20 in the optical fiber 5 and then fixed by the fixing metal wires 22. After that, a resultant substrate is set in a vacuum chamber and the metal film 20 is formed on the chirped grating 6a by vacuum plating such as sputtering or evaporation. At this time, when a mask is formed on a portion in which the formation of the metal film 20 is unnecessary, such as the substrate 9 or the metal wires 21, the metal film 20 can be selectively formed on a necessary portion. Therefore, when the metal film 20 is to be formed on the chirped grating 6a, the metal film 20 is not formed on a part of the chirped grating 6a which is located under the fixing metal wires 22, so that the metal film 20 is formed as shown in FIGS. 31, 32A, and 32B. The metal film 20 is electrically connected with the fixing metal wires 22, so the wiring pattern 18 is formed as shown in FIG. 32A so as to electrically connect the metal wire 21 and the fixing metal wire 22 with the electrode pad 10.

Figure 33:
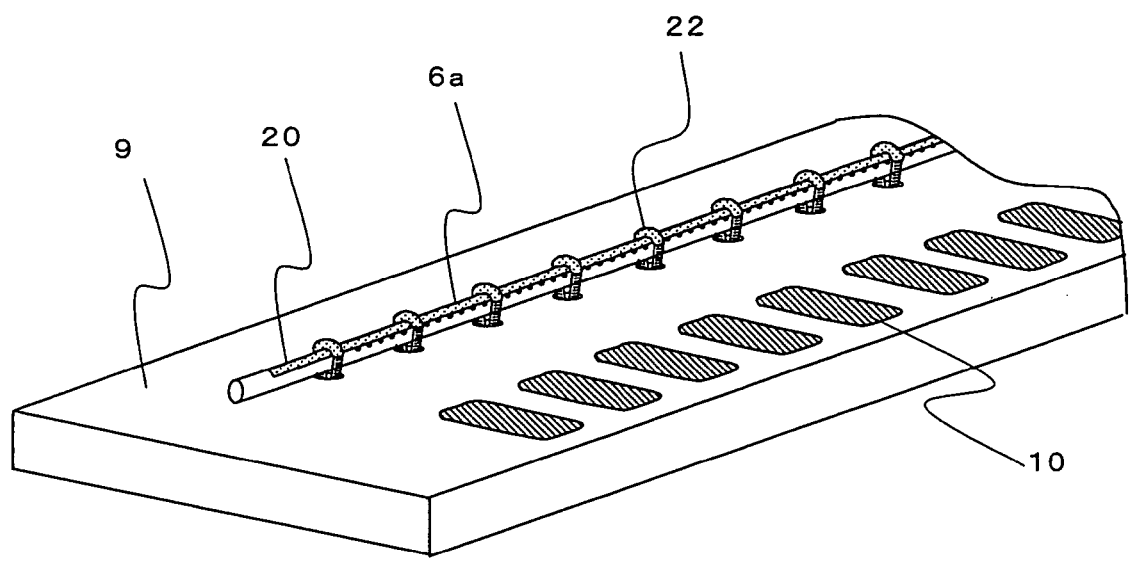
FIG. 33 is an enlarged perspective view showing a part of another chirped grating unit according to Embodiment 6 of the present invention.

In this case, each of the metal wires 21 acts as a supporter for the chirped grating 6a. As shown in FIG. 33, the metal wires 22 can be omitted to fix the chirped grating 6a by the fixing metal wires 22 and power can be supplied (the fixing metal wires become metal wires for current supply and fixation). This is possible even in the case where the metal film 20 is formed on the circumference of the chirped grating 6a as in Embodiment 4. However, when the metal film is formed on the circumference of the chirped grating 6a, a problem in which the power consumption increases to lengthen the dispersion change time occurs because of heat diffused to the substrate 9. Therefore, it is desirable to form the metal wires 21 to provide a suitable interval between the substrate 9 and the chirped grating 6a. In this embodiment, as shown in FIG. 33, when the metal film 20 is formed only on an upper surface of the chirped grating 6a, that is, on a side opposed to the substrate 9, the metal wires 21 are omitted and the chirped grating 6a is fixed by only the fixing metal wires 22. As a result, even when an interval is not provided between the chirped grating 6a and the substrate 9, it is possible to obtain the power consumption and the dispersion change time which are equal to those in the case where the metal wires 21 are formed to provide the interval between the chirped grating 6a and the substrate 9. Therefore, even when the metal film 20 is formed on the part of the circumference side surface of the chirped grating 6a as in Embodiment 5, the metal film 20 is located on only the side opposed to the substrate 9 and electrically connected with the fixing metal wires 22. In this case, the metal wires 21 are omitted, the same effect as that shown in FIG. 33 in this embodiment can be obtained.

Embodiment 7

In Embodiments 4 to 6, the chirped grating 6a on which the metal film 20 is formed is fixed by filaments such as the metal wires 21 or the fixing metal wires 22. In this embodiment, a tunable dispersion compensator in which the chirped grating 6a is fixed by the metal wires 21, the substrate 9, and the like, except for the filaments will be described.

Figure 34:
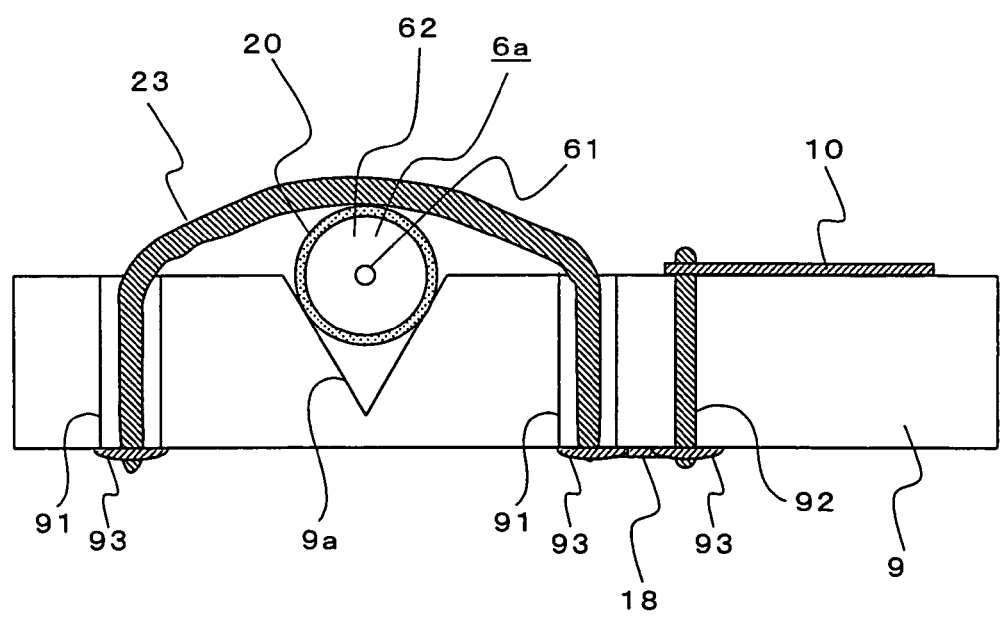
FIG. 34 is a cross sectional view showing a chirped grating unit according to Embodiment 7 of the present invention.

FIG. 34 is a cross sectional view taken along the same line as that shown in FIG. 19 or 29, showing a chirped grating unit 1a of a tunable dispersion compensator according to Embodiment 7 of the present invention. The same parts as those in each of the embodiments and parts corresponding thereto are indicated by the same reference symbols. As shown in FIG. 34, a V-shaped groove 9a to which the chirped grating 6a is to be inserted is formed in the substrate 9. The chirped grating 6a on which the metal film 20 is formed is inserted to the groove 9a and then fixed from the top by a metal wire for current supply and fixation 23. It is necessary that the groove 9a have a size in which an upper portion of the chirped grating 6a protrudes from the surface of the substrate 9 at a time when the chirped grating 6a is inserted. The chirped grating 6a is inserted to the groove 9a of the substrate 9. Then, the metal wire for current supply and fixation 23 is located across the chirped grating 6a such that the metal wire for current supply and fixation 23 and the chirped grating 6a are electrically in contact with each other and the chirped grating 6a is held from the top. The metal film 20 formed on the chirped grating 6a is electrically connected with the metal wire for current supply and fixation 23, so power is supplied from the metal wire for current supply and fixation 23 to the metal film 20.

As described above, according to the method of forming the V-shaped groove 9a in the substrate 9 and locating the chirped grating 6a in the groove, the chirped grating 6a is easily positioned because of the presence of the groove 9a. Therefore, the mass production is facilitated without any variation. In this embodiment, the V-shaped groove is formed in the substrate 9. A U-shaped groove may be formed. When the V-shaped groove is formed, a contact area between the substrate 9 and the chirped grating 6a can be reduced, so that the diffusion of heat to the substrate can be suppressed. Thus, when the power consumption is to be reduced and the dispersion change time is to be shortened, the V-shaped groove is preferable.

Embodiment 8

In Embodiments 4 to 7, the chirped grating 6a on which the metal film 20 is formed is fixed by the filaments such as the metal wires 21, the fixing metal wires 22, or the metal wire for current supply and fixation 23 and then the power is supplied to the metal film 20. In this embodiment, a tunable dispersion compensator in which the substrate is fixed without using thread metal wires and the power is supplied.

Figure 35:
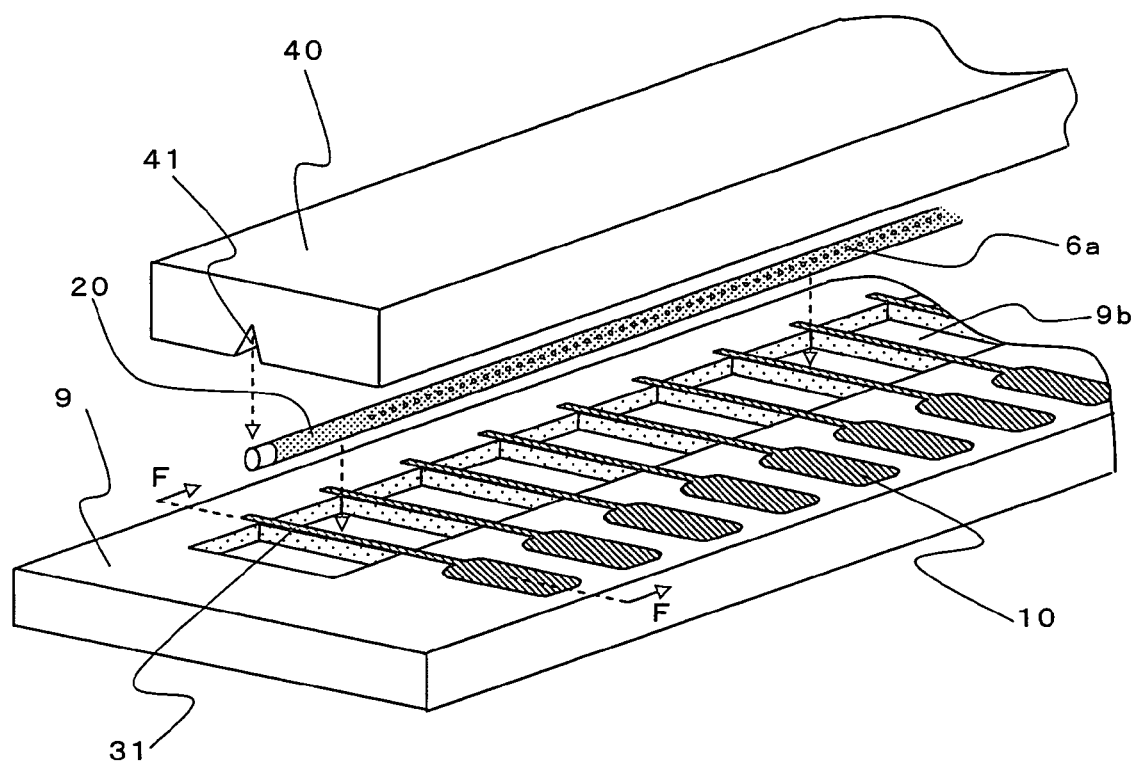
FIG. 35 is an enlarged and exploded perspective view showing a part of a chirped grating unit according to Embodiment 8 of the present invention.
Figure 36:
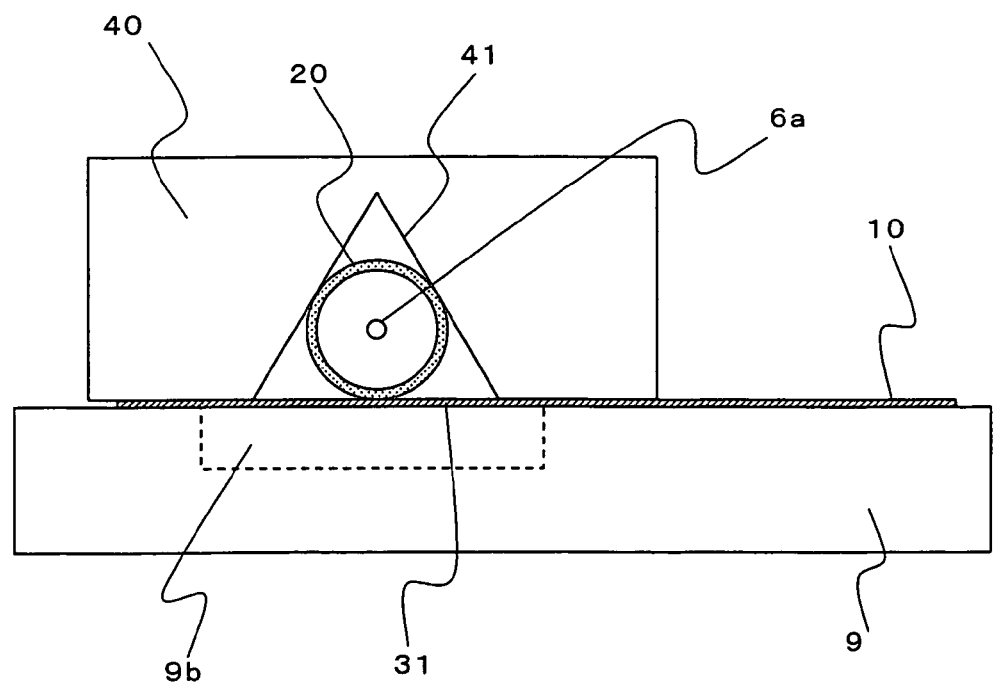
FIG. 36 is a cross sectional view showing the chirped grating unit shown in FIG. 35.

FIG. 35 is an enlarged and exploded perspective view showing a part of a chirped grating unit 1a of a tunable dispersion compensator according to Embodiment 8 of the present invention. FIG. 36 is a cross sectional view taken along the broken line F shown in FIG. 35. The same parts as those in each of the embodiments and parts corresponding thereto are indicated by the same reference symbols. In an actual case, members shown in the exploded perspective view of FIG. 35 are integrally formed as shown in the cross sectional view of FIG. 36. According to the chirped grating unit in this embodiment, metal patterns 31 corresponding to the metal wires 21 described in the above-mentioned embodiments are formed on the substrate 9. Grooves 9b forming air layers between the substrate 9 and the chirped grating 6a are provided in portions other than the metal patterns 31, of the substrate 9 on which the chirped grating 6a is located. The metal patterns 31 are electrically connected with the electrode pads 10. The powers are supplied from the control circuit 3 to the metal patterns 31 through the electrode pad 10. The chirped grating 6a is located on the metal patterns 31 of the substrate 9 and then a cover substrate with groove 40 in which a V-shaped groove 41 is formed is located on the chirped grating 6a. Therefore, the chirped grating 6a is fixed in close contact with the metal patterns 31. The cover substrate with groove 40 is fixed onto the substrate 9 by an adhesive. The cover substrate with groove 40 is preferably made of quartz, glass, or ceramic such as alumina because it can be manufactured with high precision.

The substrate 9 having the grooves 9a and the metal patterns 31 is manufactured as follows. First, the rectangular grooves 9b are formed in an insulating substrate made of quartz, glass epoxy, plastic, or the like by, for example, an etching method. The grooves 9b are to prevent the diffusion of heat from the metal film 20 formed on the chirped grating 6a, so that a depth of each of the grooves 9b is desirably approximately 0.1 mm to 2 mm. The plurality of grooves 9b are provided in the longitudinal direction of the chirped grating 6a located as shown in FIG. 35. An interval region between the adjacent grooves becomes a portion in which the metal pattern 31 is formed, so a width of the interval region may be a width necessary to form the metal pattern 31 and is desirably 20 μm to 100 μm. After a predetermined number of grooves 9b are formed in the substrate 9 as described above, the metal patterns 31 and the electrode pads 10 are integrally formed. The metal patterns 31 and the electrode pads 10 are formed by, for example, an evaporation method, a sputtering method, or a screen printing method. The metal patterns 31 and the electrode pads 10 may be formed in advance by patterning necessary portions using a mask or the like. Alternatively, a metal film may be formed on the entire surface of the substrate and then unnecessary portions may be etched to form a predetermined pattern.

In this embodiment, the grooves 9b are provided in the substrate 9 such that portions other than the metal patterns 31 are not in contact with the chirped grating 6a. It is also possible that the metal patterns 31 and the electrode pads 10 are formed on a flat substrate 9 in which the grooves 9b are not provided and then the chirped grating unit is manufactured using the cover substrate with groove 40. In this case, when the metal film 20 formed on the chirped grating 6a is in contact with the substrate 9, heat diffuses to the substrate, so that the power consumption becomes larger and the dispersion change time becomes longer. However, when so high-speed responsivity is not required, such a method may be used. When the metal patterns 31 are formed by a thick film process to obtain a film thickness of approximately 0.1 mm, heat is prevented from diffusing to the substrate 9. Thus, the same effect as that in the case where the grooves 9b are provided can be obtained while the lower power consumption is realized and the responsivity of dispersion change is maintained.

Embodiment 9

Figure 37:
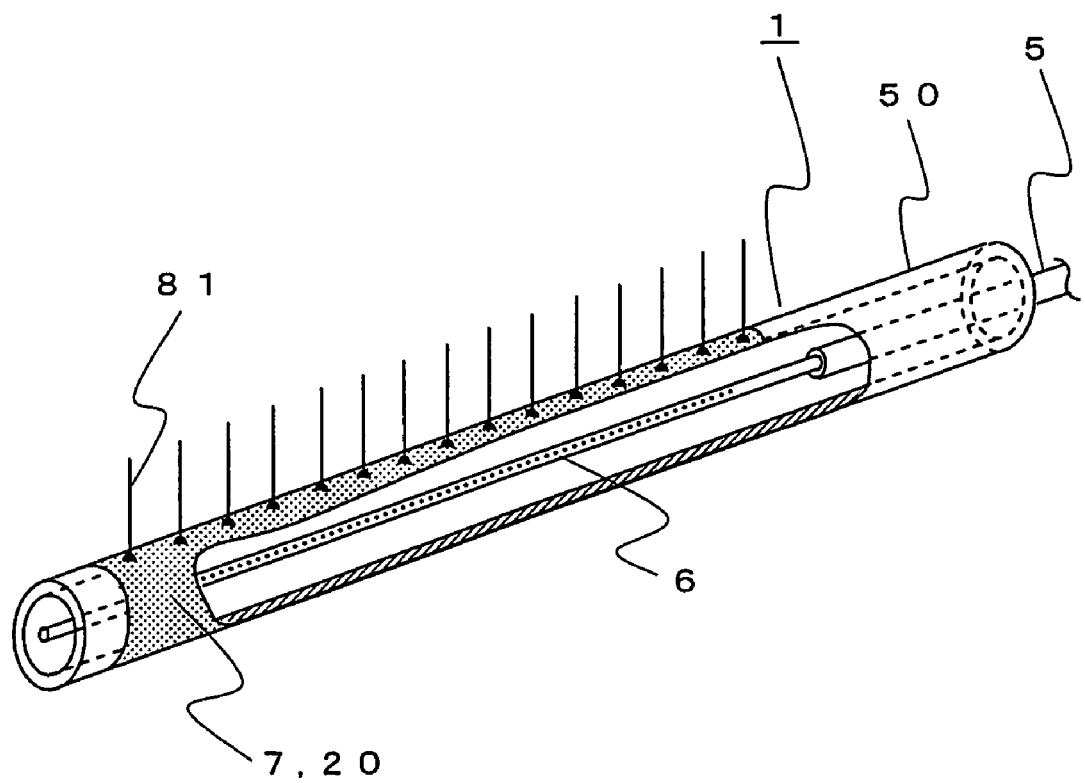
FIG. 37 is a perspective view showing a fiber grating unit according to Embodiment 9 of the present invention.

FIG. 37 is a perspective view showing a fiber grating unit of a tunable dispersion compensator having another structure according to Embodiment 9 of the present invention. The same parts as those in each of the embodiments and parts corresponding thereto are indicated by the same reference symbols. The metal film is not directly provided on the entire circumference side surface of the fiber grating 6 of the fiber grating unit 1. The thin film heater 7 or the metal film 20 is formed on an outer circumference or an inner circumference of a cylinder 50 having an inner diameter larger than a diameter of the fiber grating 6. In FIG. 37, the thin film heater 7 or the metal film 20 is formed on the inner circumference. As described above, wirings 81 are provided such that the thin film heater 7 or the metal film 20 is divided into a plurality of regions. The wirings 81 are connected with the control circuit 3. The fiber grating 6 is inserted into the cylinder 50. Therefore, the fiber grating unit 1 can be produced.

When such a structure is to be realized using the plurality of separate heater elements as in the case of the conventional tunable dispersion compensator, it is necessary to form the heat elements on the outer circumference or the inner circumference of the cylinder with high precision. However, this is extremely difficult as compared with the case where the heat elements are formed on the substrate. On the other hand, according to the tunable dispersion compensator in the present invention, the plurality of wirings 81 electrically connected with the single thin film heater or the single metal film 20 are provided. Therefore, as in the case of the conventional tunable dispersion compensator, the temperature distribution can be controlled to control the group delay time characteristic of the fiber grating. Thus, there is an effect in that the cost of the tunable dispersion compensator can be reduced and the degree of freedom with respect to an arrangement method or a manufacturing method for the thin film heater 7 or the metal film 20 can be improved.

The present invention is not limited to each of the embodiments and includes a possible combination of the embodiments. Therefore, each of the embodiments can be applied to a tunable dispersion compensator including any one of the fiber grating unit and the chirped grating unit.

What is claimed is:

1. A tunable dispersion compensator comprising:
   an optical fiber having a grating portion extending along a longitudinal direction and having a group delay time characteristic;
   heating means for heating the grating portion to apply a temperature distribution to the grating portion; and
   control means for controlling the temperature distribution applied by the heating means to control the group delay time characteristic of the grating portion, wherein
   the heating means comprises
      a heater including a single continuous conductor having electrical resistance and extending in the longitudinal direction of the grating portion along at least the entire length of the grating portion and contacting at least part of the grating portion along the length of the grating portion, and
      a plurality of wirings electrically connected to the single continuous conductor at respective positions along the longitudinal direction of the grating portion, and
   the control means supplies voltages to respective wirings, wherein portions of the continuous single conductor function as respective resistors for heating corresponding portions of the grating portion of the optical fiber.

2. The tunable dispersion compensator according to claim 1, wherein:
   one of (i) a first group including odd-numbered wirings of the plurality of wirings of the heater and (ii) a second group including even-numbered wirings of the plurality of wirings is connected to a reference potential terminal of the control means;
   the other of the first group and the second group receives a respective voltage applied by the control means; and
   the voltages are separately controlled by the control means.

3. The tunable dispersion compensator according to claim 1, wherein:
   one of (i) a first group including odd-numbered wirings of the plurality of wirings of the heater and (ii) a second group including even-numbered wirings of the plurality of wiring is continuously connected to a reference potential terminal of the control means;
   the other of the first group and the second group is alternately connected to one of the reference potential terminal and respective voltages by switching of the control means; and
   the voltages are separately controlled by the control means.

4. The tunable dispersion compensator according to claim 2, wherein each of the voltages is a voltage pulse having a predetermined voltage value and is applied at a controlled duty ratio.

5. The tunable dispersion compensator according to claim 3, wherein each of the voltages is a voltage pulse having a predetermined voltage value and is applied at a controlled duty ratio.

6. The tunable dispersion compensator according to claim 2, wherein each of the voltages is applied at a controlled voltage value.

7. The tunable dispersion compensator according to claim 3, wherein each of the voltages is applied at a controlled voltage value.

8. The tunable dispersion compensator according to claim 2, wherein:
the respective voltages are repeatedly applied for each of predetermined periods;
each of the predetermined periods includes a first sub-period and a second sub-period which are equal in duration to each other;
for the first sub-period, the first group is connected with the reference potential terminal and the respective voltages are applied to the second group; and
for the second sub-period, the second group is connected with the reference potential terminal and the respective voltages are applied to the first group.

9. The tunable dispersion compensator according to claim 1, further comprising a substrate including an electrically insulating surface, wherein
the single continuous conductor is located on the electrically insulating surface of the substrate, and
the grating portion is located on and in contact with the single continuous conductor.

10. The tunable dispersion compensator according to claim 1, further comprising a substrate, wherein
the grating portion has a generally cylindrical outside surface,
the single continuous conductor is located on at least a part of the outside surface of the grating portion, and
each of the wirings comprises a metal wire fixing the grating portion in position with respect to the substrate, contacting the single continuous conductor on the outside surface of the grating portion, and extending to the substrate.

11. The tunable dispersion compensator according to claim 1, further comprising a substrate, wherein
the grating portion has a generally cylindrical outside surface,
the single continuous conductor is located on a top part of the outside surface of the grating portion, opposite the substrate,
each of the wirings comprises a metal wire fixing the grating portion in position with respect to the substrate, and
the wirings extend across the grating portion and contact the top of the outside surface of the optical fiber.

12. The tunable dispersion compensator according to claim 1, further comprising a substrate having a surface containing a longitudinal groove, wherein
the grating portion has a generally cylindrical outside surface,
the single continuous conductor is located on all of the outside surface of the grating portion,
each of the wirings comprises a metal wire extending across the grating portion and contacting a top surface of the optical fiber and the single continuous conductor, and fixing the grating portion in place with respect to the substrate, and
a part of the grating portion is disposed in the longitudinal groove in contact with the substrate, and protrudes from the surface of the substrate.

13. The tunable dispersion compensator according to claim 1, further comprising a substrate including a plurality of recesses, wherein
the grating portion has a generally cylindrical outside surface,
each of the wirings comprises a respective metal pattern on the substrate between a respective pair of the recesses,
the single continuous conductor covers the outside surface of the
grating portion and contacts the metal pattern on the substrate, and the recesses produce respective air layers between closest pairs of the metal patterns.

14. A tunable dispersion compensator comprising:
an optical fiber having an outside diameter and a grating portion extending along a longitudinal direction and having a group delay time characteristic;
a heater for heating the grating portion to apply a temperature distribution to the grating portion; and
control means for controlling the temperature distribution applied by the heating means to control the group delay time characteristic of the grating portion, wherein
the heater comprises
a tubular body having inner and outer surfaces and a single continuous conductor located on one of the outer surface and the inner surface of the tubular body, wherein the tubular body has inside diameter larger than the outside diameter of the optical fiber, the grating portion is located within the tubular body, and the single continuous conductor has electrical resistance and extends in the longitudinal direction of the grating portion along at least the entire length of the grating portion, and
a plurality of wirings electrically connected to the single continuous conductor at respective positions along the longitudinal direction of the grating portion, and
the control means supplies voltages to respective wirings, wherein portions of the continuous single conductor function as respective resistors for heating corresponding portions of the grating portion of the optical fiber.

15. A method of manufacturing a tunable dispersion compensator comprising:
forming a heater including a single conductor, which extends in a longitudinal direction of a grating portion of an optical fiber, at least along an entire length of the grating portion;
forming a plurality of metal wires for separately supplying power to the heater on a substrate;
locating the optical fiber on the substrate, holding the heater on the plurality of metal wires, and bringing the heater into electrical contact with each of the metal wires; and
fixing the grating portion onto the plurality of metal wires with a plurality of fixing metal wires.

16. The method of manufacturing the tunable dispersion compensator according to claim 15, further comprising:

performing one of gold plating and tin plating on the heater, in advance of locating the optical fiber on the substrate, and performing one of tin plating and gold plating on the plurality of metal wires, in advance of locating the optical fiber on the substrate; and heating at least a contact portion between the heater and each of the metal wires to form a gold tin alloy at an interface between a plated gold layer and a plated tin layer, after fixing the grating portion onto the metal wires.

17. The method of manufacturing the tunable dispersion compensator according to claim 16, wherein the heating comprises supplying a current to the heater.

18. A method of manufacturing a tunable dispersion compensator comprising:

fixing an optical fiber onto a substrate with a plurality of metal wires for electrical connection and fixation in a longitudinal direction of a grating portion of the optical fiber; and forming a heater including a single conductor on an upper surface side of the grating portion and an upper surface side of each of the metal wires which are opposed to the substrate.

* * * * *